United States Patent
Lee et al.

(10) Patent No.: US 9,443,328 B2
(45) Date of Patent: Sep. 13, 2016

(54) MOBILE TERMINAL AND METHOD OF CONTROLLING THE MOBILE TERMINAL FOR DISPLAYING VISUAL EFFECTS IN A USER INTERFACE

(71) Applicant: LG ELECTRONICS INC., Seoul (KR)

(72) Inventors: Yoonmi Lee, Seoul (KR); Yoongwoo Yoon, Seoul (KR); Nara Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 259 days.

(21) Appl. No.: 14/073,676

(22) Filed: Nov. 6, 2013

(65) Prior Publication Data

US 2014/0218393 A1  Aug. 7, 2014

(30) Foreign Application Priority Data

Feb. 6, 2013 (KR) .......................... 10-2013-0013471

(51) Int. Cl.
*G06F 3/0481* (2013.01)
*G06T 11/00* (2006.01)
*G06F 3/0488* (2013.01)

(52) U.S. Cl.
CPC .......... *G06T 11/001* (2013.01); *G06F 3/0481* (2013.01); *G06F 3/04883* (2013.01)

(58) Field of Classification Search
None
See application file for complete search history.

(56) References Cited

U.S. PATENT DOCUMENTS

| 5,438,660 A * | 8/1995 | Lee ........................ G06F 3/0481 715/797 |
| 5,544,295 A * | 8/1996 | Capps .................... G06F 3/0481 345/473 |
| 2010/0295805 A1* | 11/2010 | Shin ..................... G06F 3/04883 345/173 |
| 2011/0084962 A1* | 4/2011 | Kim ..................... G06F 3/04842 345/419 |
| 2012/0256927 A1* | 10/2012 | Son ........................ G06F 3/0483 345/443 |
| 2013/0187861 A1* | 7/2013 | Lavallee ................. G06F 9/543 345/173 |
| 2013/0314341 A1* | 11/2013 | Lee ....................... G06F 3/0488 345/173 |

* cited by examiner

*Primary Examiner* — Ryan D McCulley
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a memory configured to store a material texture assigned to a type of an application executed on the mobile terminal; a display unit configured to display screen information having the material texture assigned to the type of the application executed on the mobile terminal; and a controller configured to receive an input on the displayed screen information, and apply a visually changing textural effect to the displayed screen information that corresponds to the material texture assigned to the type of the application.

7 Claims, 24 Drawing Sheets

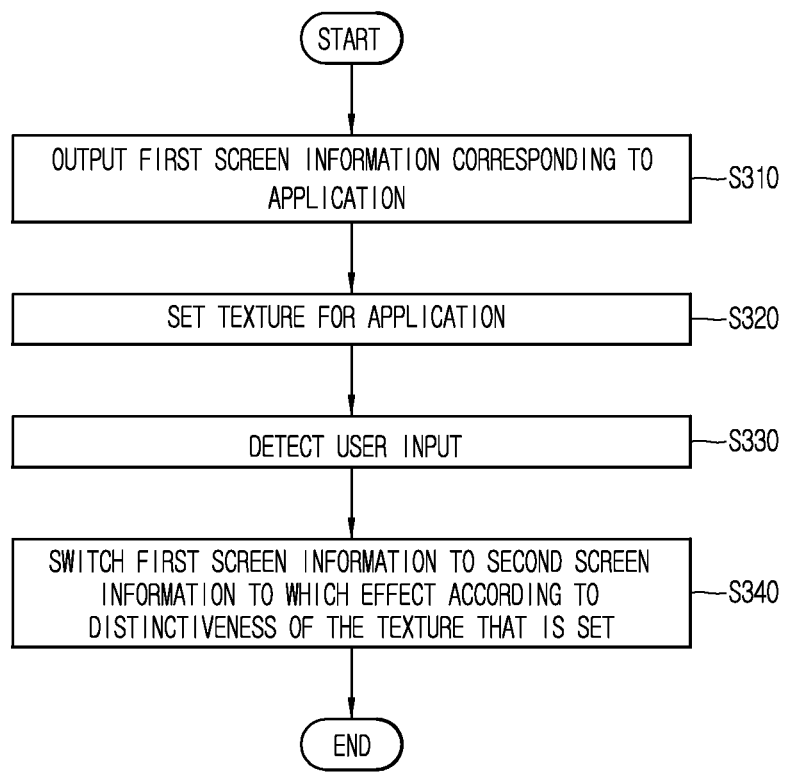

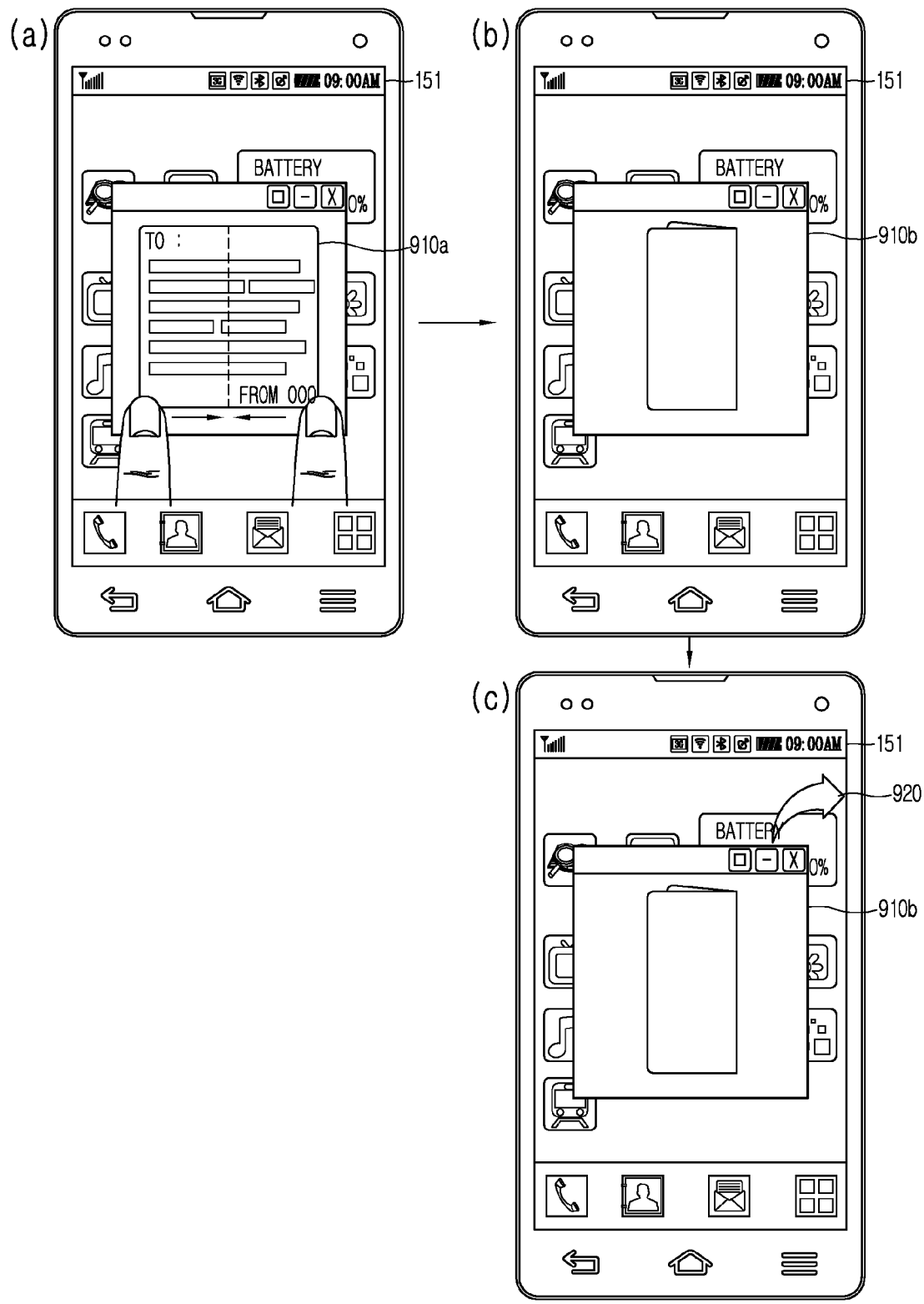

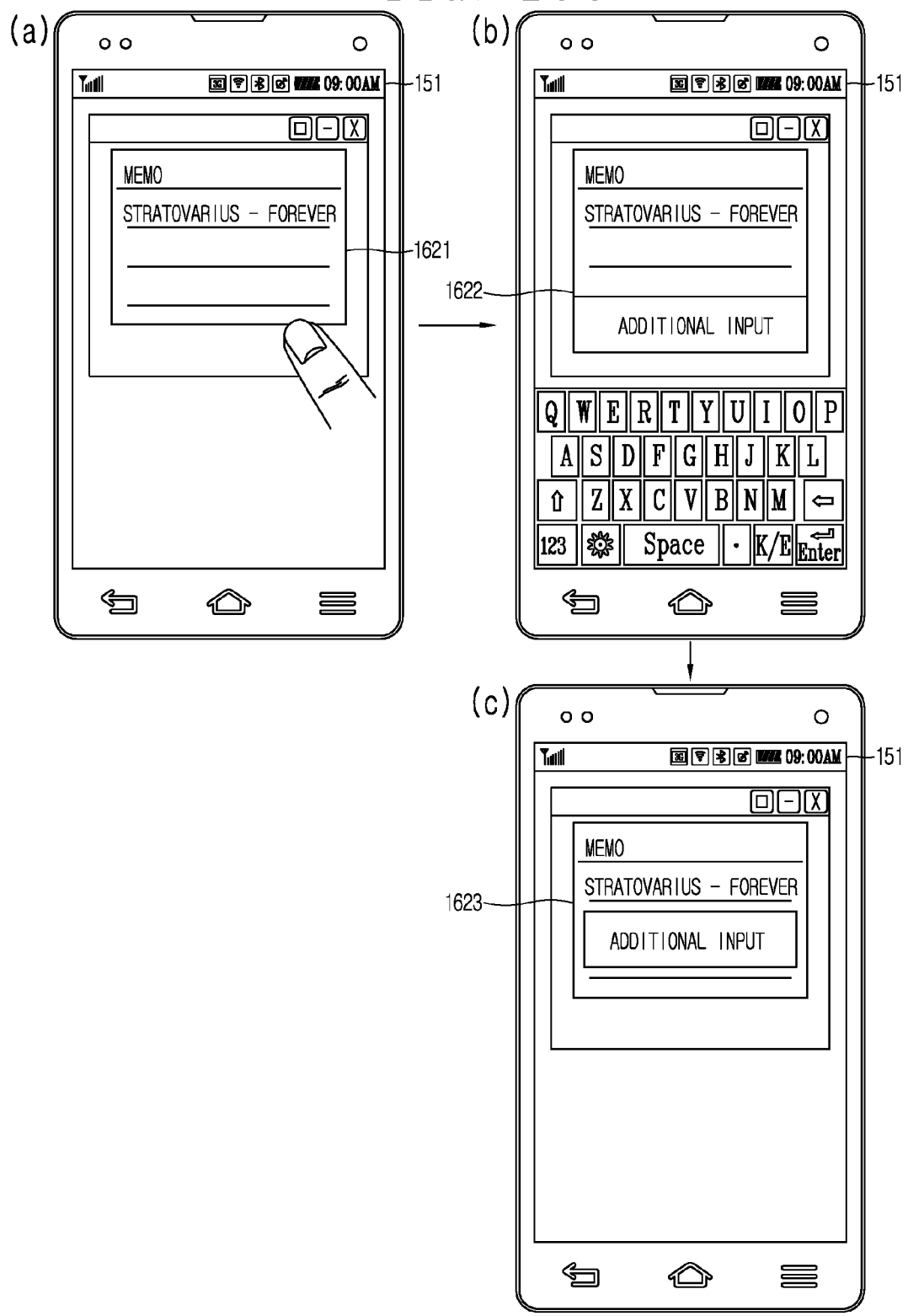

MOBILE TERMINAL AND METHOD OF CONTROLLING THE MOBILE TERMINAL FOR DISPLAYING VISUAL EFFECTS IN A USER INTERFACE

CROSS-REFERENCE TO RELATED APPLICATION

Pursuant to 35 U.S.C. §119(a), this application claims the benefit of earlier filing date and right of priority to Korean Application No. 10-2013-0013471, filed on Feb. 6, 2013, the contents of which is incorporated by reference herein in its entirety.

BACKGROUND OF THE INVENTION

1. Field of the Invention

The present invention relates to a mobile terminal and a method of controlling the mobile terminal.

2. Background of the Invention

In general, a terminal may be classified into a mobile (portable) terminal and a stationary terminal. The mobile terminal may be also classified into a handheld terminal and a vehicle mount terminal.

The terminal can also support more complicated functions such as capturing images or video, reproducing music or video files, playing games, receiving broadcast signals, and the like. Thus, the mobile terminal functions as a multimedia player or a device and has more functions than before. However, it is difficult for the user to perform the complex functions.

SUMMARY OF THE INVENTION

Therefore, one object of the present invention is to provide a mobile terminal that provides a user with intuitive visual information and that allows the user to set a specific texture for an application, based on a predetermined reference and if a user input is detected, a screen corresponding to the application is switched to a screen to which an effect according to the texture that is set is applied.

To achieve these and other advantages and in accordance with the purpose of this specification, as embodied and broadly described herein, there is provided a mobile terminal including a display unit to which first screen information corresponding to an application is output, a texture setting unit that sets at least one texture for the application, based on the predetermined reference a predetermined reference, and a controller that, if a user input to the first screen information is detected, switches the first screen information to a second screen information to which an effect according to distinctiveness of the texture that is set is applied.

In the mobile terminal, the texture setting unit may set at least one texture for the application, according to at least one of a first reference based on the user input and a second reference based on a function of the application.

In the mobile terminal, if it is detected that at least two touch points, first and second touch points from which a drag touch input to the first screen information starts is moved in a direction in which they approach each other, the controller may perform control command to switch the first screen information to the second screen information to which an effect of crumpling a sheet of paper is applied along the direction and delete the second screen information.

In the mobile terminal, if it is detected that the first touch point from which the drag touch input to the first screen information starts is moved in a given direction, the controller may switch the first screen information to the second screen information to which an effect of folding a sheet of paper is applied along the given direction, and may transmit a message included in the second screen information to a destination included in the second screen information.

In the mobile terminal, the controller may detect a touch input to the first screen information and, if the detected touch input meets a predetermined reference, the controller may switch the first screen information to second screen information to which an effect of breaking a glass is applied.

In the mobile terminal, if the detected touch input is changed from a first touch to a second touch, the controller may switch the second screen information corresponding to the first touch to third screen information corresponding to the second touch.

In the mobile terminal, if the second screen information is output, the controller may control the display unit in such a manner that a graphic object on a background screen that is veiled by the first screen information is viewed.

In the mobile terminal, the first screen information corresponding to a first application and the third screen information corresponding to a second application may be output to the display unit, and if a drag touch input to the first screen information is ended on at least one part of a region to which the third screen information is output, the controller may execute a control command relating to the second application, based on data included in the first screen information.

In the mobile terminal, if the second screen information is output and a predetermined amount of time elapses, the controller may switch the second screen information back to the first screen information.

In the mobile terminal, if it is detected that at least one of first and second touch points from which a drag touch to the first screen information start is moved in a direction in which the one goes away from the other, the controller may switch the first screen information to the second screen information to which an effect of expanding a rubber is applied along the direction.

In the mobile terminal, if the touch input to at least one of the first and second touch points is ended, the controller may switch the second screen information back to the first screen information and cancels execution of a control command relating to the application.

In the mobile terminal, if according to the drag touch input, at least one part of a region to which the second screen information is output is out of a reference region, the controller may execute a control command in which the second screen information is divided into two parts, and the two parts are deleted while being moved in the first and second directions.

In the mobile terminal, if according to the drag touch input, at least one part of the region to which the second screen information reaches the reference region, the controller may output a warning alarm to the second screen information.

In the mobile terminal, a size of a region of the second screen information may be decreased at a given interval of time, and the controller may monitor the size of the region of the second screen information, and if, as a result of the monitoring, the size of the region of the second screen information is the same as a size of a region of the first screen information, the controllers may perform control in such a manner that an alarm signal is output.

In the mobile terminal, the controller may perform the control in such a manner that a difference in the size of the region between the first screen information and the second screen information is converted as time data, the extent to which the size of the region of the second screen information is decreased, is applied to the time data, and the time data is output to the display unit.

In the mobile terminal, the controller may perform control in such a manner that a function relating to a text input is performed on at least one region of the second screen information.

In the mobile terminal, if a predetermined-type touch input is detected after performing an input of the text on the second screen information, the controller may switch the second screen information back to the first screen information and adds the input of the text to the first screen information.

In the mobile terminal, if a touch input to the first touch point is maintained and the drag touch input to the second touch point is ended, the controller may perform control in such a manner that the second screen information is switched back to the first screen information and disappears from the display unit while being moved in a direction opposite to a direction in which the drag touch input is dragged.

In the mobile terminal, if the first screen information disappears from the display unit, the controller may transmit a message included in the first screen information to a destination included in the first screen information.

In the mobile terminal, the controller may control the display unit in such a manner that visual highlighting processing is performed on at least one of the first screen information and the second screen information, and the result of the processing is output.

In the mobile terminal, the user may input includes at least one of a vibration of the mobile terminal, an inclined state of the mobile terminal, a signal input through a microphone, a touch input, and a drag touch input.

In the mobile terminal, if it is detected that a drag touch input to the first screen information is ended at a first touch point, the controller may perform control in such a manner that the first screen information is switched to the second screen information to which an effect of spreading a water drop is applied, the result of the conversion is output to the first touch point, and an execution screen of the application is output to the second screen information.

To achieve these and other advantages and in accordance with the purpose of this specification, as embodied and broadly described herein, there is provided a method of controlling a mobile terminal, including outputting first screen information corresponding to an application, setting at least one texture for the application, based on a predetermined reference, detecting a user input to the first screen information, and switching the first screen information to second screen information to which an effect according to distinctiveness of the texture that is set is applied, in response to the user input.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 3 is a flowchart illustrating a method of controlling the mobile terminal according to the embodiment of the present invention;

FIG. 9A and FIG. 9B are diagrams illustrating an example in which, according to a sixth embodiment, the screen information in the application is transmitted while being folded as if it were a sheet of paper;

FIG. 16C includes diagrams illustrating an example in which, according to a sixteenth embodiment, an editing-related function is possible to perform while the screen information in the application expands as if it were a rubber.

DETAILED DESCRIPTION OF THE INVENTION

Hereinafter, a mobile terminal of the present invention will be explained in more detail with reference to the attached drawings. For the sake of brief description with reference to the drawings, the same or equivalent components will be provided with the same reference numbers, and description thereof will not be repeated.

The mobile terminal according to the present invention may include a smart phone, a laptop computer, a digital broadcasting terminal, a Personal Digital Assistant (PDA), a Portable Multimedia Player (PMP), a navigation system, a slate PC, a tablet PC, an ultra book, etc. However, it will be obvious to those skilled in the art that the present invention may be also applicable to a fixed terminal such as a digital TV and a desktop computer, except for specific configurations for mobility.

Figure 1:
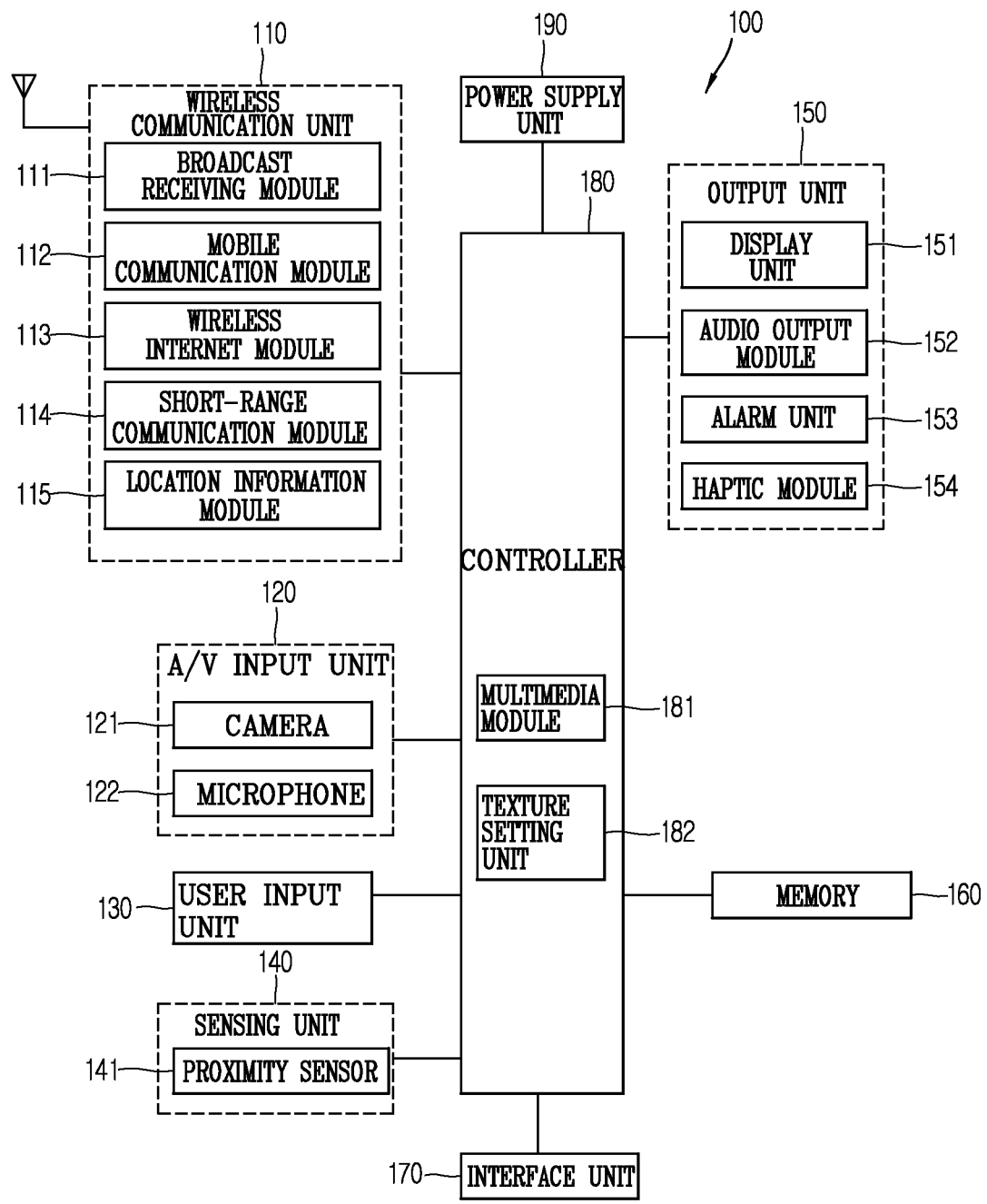
FIG. 1 is a block diagram illustrating a mobile terminal according to an embodiment of the present invention.

FIG. 1 is a block diagram of a mobile terminal according to an embodiment of the present invention. As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network. In this instance, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views counterpart, whereas the voice call mode indicates a call performed while a user does not view counterpart. For implementation of the video call mode and the voice call mode, the mobile communication module 112 is configured to transmit and receive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 114 is a module for supporting short range communications. Some examples of short range communication technology include Bluetooth™, Radio Frequency IDentification (RFID), Infrared Data Association (IrDA), Ultra-WideBand (UWB), ZigBee™, Near Field Communication (NFC) and the like.

The location information module 115 is a module for acquiring a location (or position) of the mobile communication terminal. For example, the location information module 115 may include a GPS (Global Positioning System) module.

Referring to FIG. 1, the A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display 151.

The image frames processed by the camera 121 may be stored in the memory 160 or transmitted via the radio communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display 151, an audio output module 152, an alarm unit 153, a haptic module 154, and the like.

The display 151 may display information processed in the mobile terminal 100. For example, when the mobile terminal 100 is in a phone call mode, the display 151 may display a User Interface (UI) or a Graphic User Interface (GUI) associated with a call. When the mobile terminal 100 is in a video call mode or image capturing mode, the display 151 may display a captured image and/or received image, a UI or GUI.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display. Some of these displays may be configured to be transparent so that outside may be seen therethrough, which may be referred to as a transparent display. A representative example of this transparent display may include a transparent organic light emitting diode (TOLED), etc.

The mobile terminal 100 may include two or more displays 151. The rear surface portion of the display 151 may also be implemented to be optically transparent. Under this configuration, a user can view an object positioned at a rear side of a body through a region occupied by the display 151 of the body. The display 151 may be implemented in two or more in number according to a configured aspect of the mobile terminal 100. For instance, a plurality of displays may be arranged on one surface integrally or separately, or may be arranged on different surfaces.

Here, if the display 151 and a touch sensitive sensor (referred to as a touch sensor) have a layered structure therebetween, the structure may be referred to as a touch screen. The display 151 may be used as an input device rather than an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area of a touch object, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display 151 has been touched.

Referring to FIG. 1, the proximity sensor 141 may be arranged at an inner region of the mobile terminal covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this instance, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this instance, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch motion state, or the like), and information corresponding to the sensed proximity touch operation and the proximity touch pattern can be output to the touch screen.

The audio output module 152 may output audio data received from the radio communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like.

In addition to video or audio signals, the alarm unit 153 may output signals in a different manner, for example, to inform about an occurrence of an event. For example, the alarm unit 153 may output a signal in the form of vibration. The video signal or audio signal may be output through the display 151 or the voice output module 152. Therefore, the display 151 and the voice output module 152 may be categorized as part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are input or output. The memory 160 may store data relating to various patterns of vibrations and sounds output when touch input to the touch screen is sensed.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Once a preset condition of the mobile terminal is satisfied, the controller 180 can execute a locked state for limiting a user's input of control commands with respect to applications. Further, the controller 180 can control a locked screen displayed in the locked state, based on a touch input sensed by the display 151 in the locked state.

The power supply unit 190 receives external power or internal power and supplies appropriate power required for operating respective elements and components under control of the controller 180.

Various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2A:
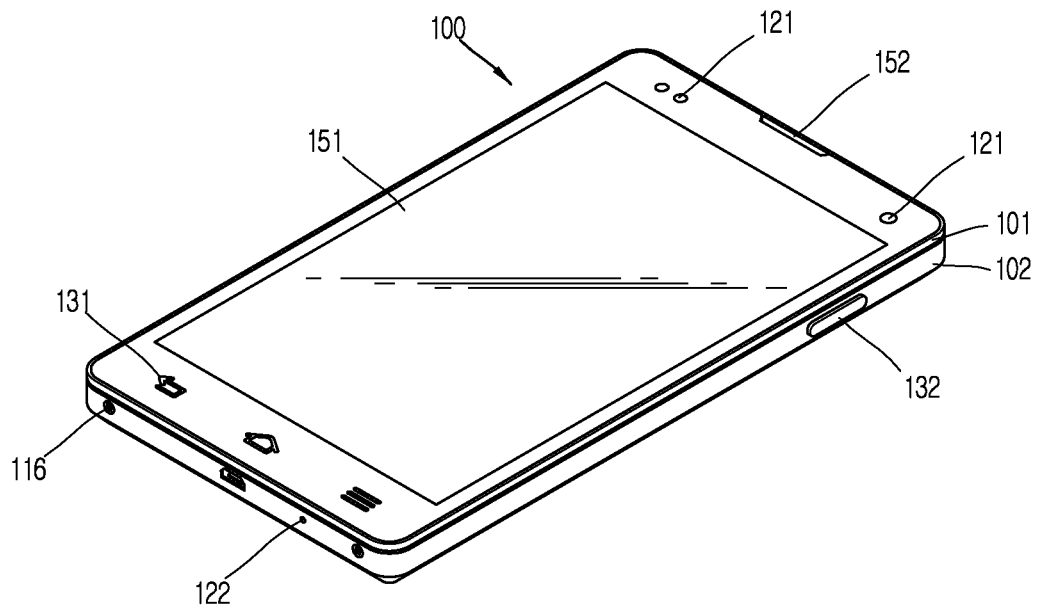
FIGS. 2A and 2B are front perspective views, each illustrating one example of the mobile terminal according to the embodiment of the present invention.
Figure 2B:
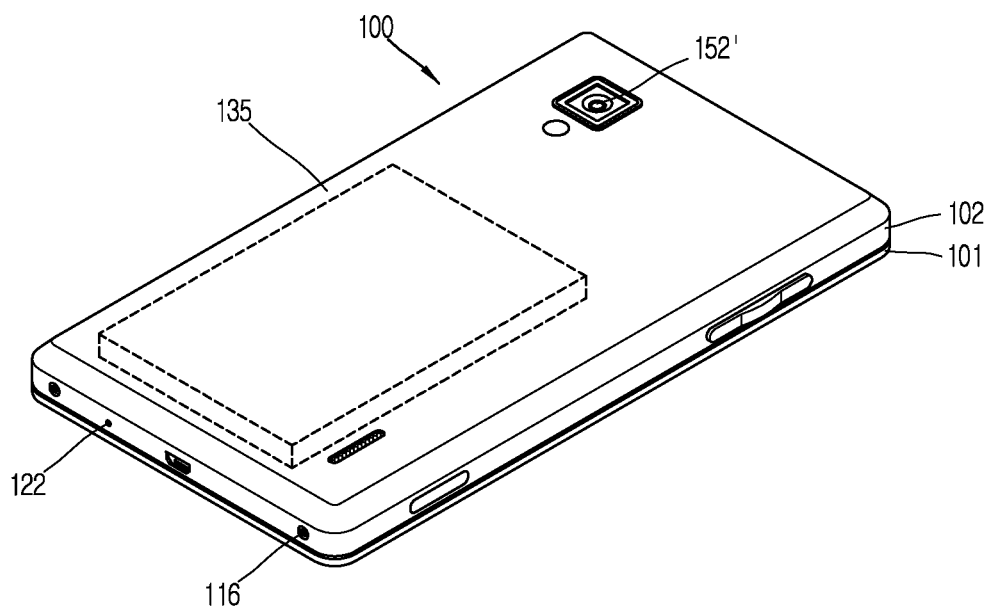

FIG. 2A is a front perspective view of the mobile terminal according to an embodiment of the present invention, and FIG. 2B is a rear perspective view of the mobile terminal according to an embodiment of the present invention. The mobile terminal 100 according to the present invention is a bar type mobile terminal. However, the present invention is not limited to this, but may be applied to a slide type in which two or more bodies are coupled to each other so as to perform a relative motion, a folder type, or a swing type, a swivel type and the like.

A body of the mobile terminal 100 has a front surface, side surfaces and a rear surface. The body has two ends in a lengthwise direction.

A case (casing, housing, cover, etc.) forming an outer appearance of the body 100 may include a front case 101 and a rear case 102. A space formed by the front case 101 and the rear case 102 may accommodate various components therein. At least one intermediate case may further be disposed between the front case 101 and the rear case 102. Such cases may be formed by injection-molded synthetic resin, or may be formed using a metallic material such as stainless steel (STS) or titanium (Ti).

At the front case 101, may be disposed a display 151, an audio output unit 152, a camera 121, user input units 130/131 and 132, a microphone 122, an interface unit 170, etc.

The display 151 occupies most parts of a main surface of the front case 101. The audio output unit 152 and the camera 121 are arranged at a region adjacent to one end of the stereoscopic display 151, and the user input unit 131 and the microphone 122 are arranged at a region adjacent to another end of the display 151. The user input unit 131, the interface unit 170, etc. may be arranged on side surfaces of the front case 101 and the rear case 102. The microphone 122 is disposed at another end of the body 100.

The user input unit 130 is manipulated to receive a command for controlling the operation of the mobile terminal 100, and may include a plurality of manipulation units 131 and 132. The manipulation units may be referred to as manipulating portions, and may include any type of ones that can be manipulated in a user's tactile manner.

Commands input through the first or second user input units 131 and 132 may be variously set. For instance, the first manipulation 131 is configured to input commands such as START, END, SCROLL or the like, and the second manipulation unit 132 is configured to input commands for controlling a level of sound output from the audio output unit 152, or commands for converting the current mode of the display 151 to a touch recognition mode. A retractable broadcast antenna 116 can also be provided.

Referring to FIG. 2B, an audio output unit 152' may be additionally disposed at the rear case 102. The audio output unit 152' may implement a stereo function together with the audio output unit 152 (refer to FIG. 2A), and may be used for calling in a speaker phone mode.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display 151, the touch pad 135 may be formed to be light-transmissive. In this instance, if the display 151 is configured to output visual information from two surfaces thereof, the visual information can be recognized through the touch pad 135. The information output from the two surfaces can be controlled by the touch pad 135. Alternatively, a display may be additionally mounted to the touch pad 135, so that a touch screen can be disposed at the rear case 102.

A camera 121' may be additionally provided on the rear case 102. The camera 121' faces a direction which is opposite to a direction faced by the camera 121 (refer to FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed at the body 100 so as to rotate or pop-up.

A flash 123 and a mirror 124 may be additionally disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 252' may be additionally arranged on a rear surface of the body. The audio output unit 252' (refer to FIG. 2A) may cooperate with the audio output unit 252 (refer to FIG. 2A) so as to implement a stereo function. Also, the audio output unit may be configured to operate as a speakerphone.

A power supply unit 190 for supplying power to the mobile terminal 100 is mounted to the body. The power supply unit 190 may be mounted in the body, or may be detachably mounted to the body.

The touch pad 135 operates in association with the display 151 of the front case 101. The touch pad 135 may be disposed on the rear surface of the display 151 in parallel. The touch pad 135 may have a size equal to or smaller than that of the display 151.

In addition, the mobile terminal according to an embodiment of the present invention provides a user with intuitive visual information by applying an effect resulting from the distinctiveness of a predetermined texture to an icon or an execution screen of an application and thus with a user environment in which an easy control is available for a user.

Accordingly, in the mobile terminal according to an embodiment of the present invention and a method of controlling the mobile terminal, based on a predetermined reference, at least one texture is set for the application, and when screen information corresponding to the application is output and a user input to the screen information is detected, the screen information is converted to different screen information to which the effect resulting from the predetermined texture is applied and the result of the conversion is output.

Next, FIG. 3 is a flowchart illustrating a method of controlling the mobile terminal according to the embodiment of the present invention. As shown, the display unit 151 outputs first screen information corresponding to an application (S310). Here, the application means any one of the multiple applications installed in the mobile terminal. The application may be one of the multiple applications, which is selected and executed by the user.

In addition, the application that is output to the display unit 151 may be two or more in number, and for the multiple applications, the screen information corresponding to each of the multiple applications is output. Further, the first screen information, for example, includes all visual information relating to the application, such as an icon and an execution screen of the application, and a specific page in the application. For example, the first screen information may be the execution screen of the application that is output in the form of a pop-up window to at least one region of the display unit 151.

The mobile terminal 100 then sets at least one texture for the application, based on the predetermined reference (S320). Here, the texture means a characteristic possessed by a specific material, including a tactile impression and a tissue state of a surface of a specific object. For example, a nature that paper, rubber, glass, water, a tree, or a stone in itself has corresponds to the texture.

The predetermined reference includes a first reference, based on a user input, and a second reference, based on a function of the application. To do this, the mobile terminal 100 includes a texture setting unit for setting at least one texture for the application, based on the predetermined reference.

The texture setting unit may set a specific texture for the application, based on the user input (the first reference), and may enable the specific texture to be automatically set for the application (the second reference), based on the function that the application has. For example, if the texture setting depends on the second reference, in which case the texture is automatically set based on the function of the application, when the application includes an editing function, a first texture is set for the application, and when the application does not include the editing function, a second texture is set for the application.

In addition, the texture setting unit deletes or changes a predetermined specific texture. Further, the texture setting unit sets the multiple properties for one application and applies different effects, resulting from the different properties, to the one application, based on a predetermined condition.

On the other hand, when, even though the user inputs that are of the same are applied, the properties that are set are different, different items of second screen information are output. In addition, even though the properties that are set are of the same, the different items of second information are output depending on the manner that the user input is applied and on the extent to which the user input is applied.

The controller 180 receives information on the texture that is set for the application, from the texture setting unit. The controller 180 determines the distinctiveness of the texture to be applied to the screen information that is output, based on the received information on the texture. In addition, the controller 180 sets the condition for applying the effect resulting from the texture that is set (for example, when the user input or the specific function of the specific application is performed), in advance.

In this manner, when the first screen information in the application is output, the controller 180 detects the user input to the first screen information (S330). Here, the user input is any one of a touch input and a user drag touch input for executing a certain control command, a vibration applied to the mobile terminal, an inclined state of the mobile terminal, a signal that is input to a microphone, and a specific gesture.

In addition, with regard to the detection of the user input, a signal, input through at least one sensor provided in the mobile terminal 100, is detected and the detected signal is transmitted to the controller 180. For example, if the user input is the touch input, the controller 180 detects a touch point to which the touch is applied, the number of times that the touch is applied, an amount of time for which the touch is maintained, and a direction in which the touch is dragged.

When the user input is detected in this manner, the controller 180 converts the first screen information to the second screen information to which the effect resulting from the texture that is set is applied, in response to the user input to the first screen information (S340). Here, the effect resulting from the distinctiveness of the texture that is set means a phenomenon that results from a physical, chemical, or mechanical nature possessed by the texture that is set revealing itself after applying a specific external force.

For example, if the texture that is set is a texture of paper, an effect is applied, such as crumpling, tearing, flying, folding, or rolling. Such an effect appears, depending on strength, hardness, attraction, and the like of paper. In this manner, the controller 180 outputs the second screen information on the display unit 151, as a result of applying the effect resulting from the distinctiveness of the texture that is set, to the first screen information.

At this time, even though the first screen information is changed to the second screen information, the controller 180 performs the control in such a manner that a text included in the first screen information remains unchanged. Assume, for example, that the first screen information is an execution screen of a diary application and the texture of the corresponding application that is set is a texture of paper. If the user drag touch input is detected, the execution screen of the diary application is switched to the second screen information to which the effect of crumpling a sheet of paper is applied. Here, the controller 180 detects a dragging direction and applies the effect of crumpling a sheet of paper, along the dragging direction.

The controller 151 applies the effects that differ depending on a size of a signal detected through the user input, to the second screen information. For example, when the user makes a blowing gesture toward the microphone of the mobile terminal 100, this is converted to a haptic signal and the result of the conversion is transmitted to the controller 180. The controller 180 applies the effect of crumpling a sheet of paper, to the second screen information, in such a manner as to correspond to the size of the transmitted haptic signal.

In addition, when a screen switch is made from first screen information to the second screen information, or when the screen switch to the second screen information is completed, the controller 151 outputs a highlighting effect as well.

When the screen switch to the second screen information is completed, the controller 180 controls the display unit 151 in such a manner that graphic objects on the background screen, such as the icons of the applications, which are veiled by the first screen information, appear.

That is, a specific region of the display unit 151, which is veiled when the first screen information is output, is regained. Here, the background screen is any one of a home screen, a locked screen, and an execution screen of a different application.

In addition, even though the screen switch is made from the first screen information to the second screen information, the controller 180 maintains the text or an image included in the first screen information, without any change. Furthermore, if the switch to the second screen information is completed, the controller 180 of the mobile terminal 100 performs a specific control command on the application.

Here, the control command includes a control command viewed intuitively from the second screen information that is output. For example, when the second screen information is the screen information to which an effect of tearing a sheet of paper is applied, the control command to delete the corresponding screen information or to end the execution of the corresponding application is executed. As another example, when the second screen information is the screen information to which an effect of folding a letter envelope is applied, the control command to transmit the content including in the corresponding screen information is executed.

In addition, the control command includes a control command that is viewed intuitively from a function of the application. For example, if the application that corresponds to the second screen information is an application that performs a timer function, it is possible that an alarm is output with the control command. Further, if the application that corresponds to the second screen information is an application that has the editing functions, it is possible that the inputting and the storing are performed with the control command.

If the control command is executed along with the switch to the second screen information, the controller 180 compares an attribute of the first screen information with an attribute of the second screen information and only when a predetermined value is exceeded, the control command is executed. For example, only when the extent to which the crumpling effect is applied to the second screen information exceeds the predetermined value, the command to delete the corresponding screen is executed.

When a predetermined amount of time elapses (for example, one to two seconds, or an amount of time set by the user) when the switch to the second screen information is completed, the second screen information is switched back to the first screen information. When the first screen information is output back to the display unit 151, the controller 180 cancels the control command that is transmitted, or is executed.

Specific embodiments of the present invention are described in detail below referring to the accompanying drawings. According to the embodiments disclosed below, the method of controlling a mobile terminal is described based on a specific texture that is set for the application. That is, according to the embodiments of the present invention disclosed below, the different methods of controlling the mobile terminal are used based on the texture that is set. However, the embodiments of the present invention are not limited to the specific texture disclosed.

Figure 4:
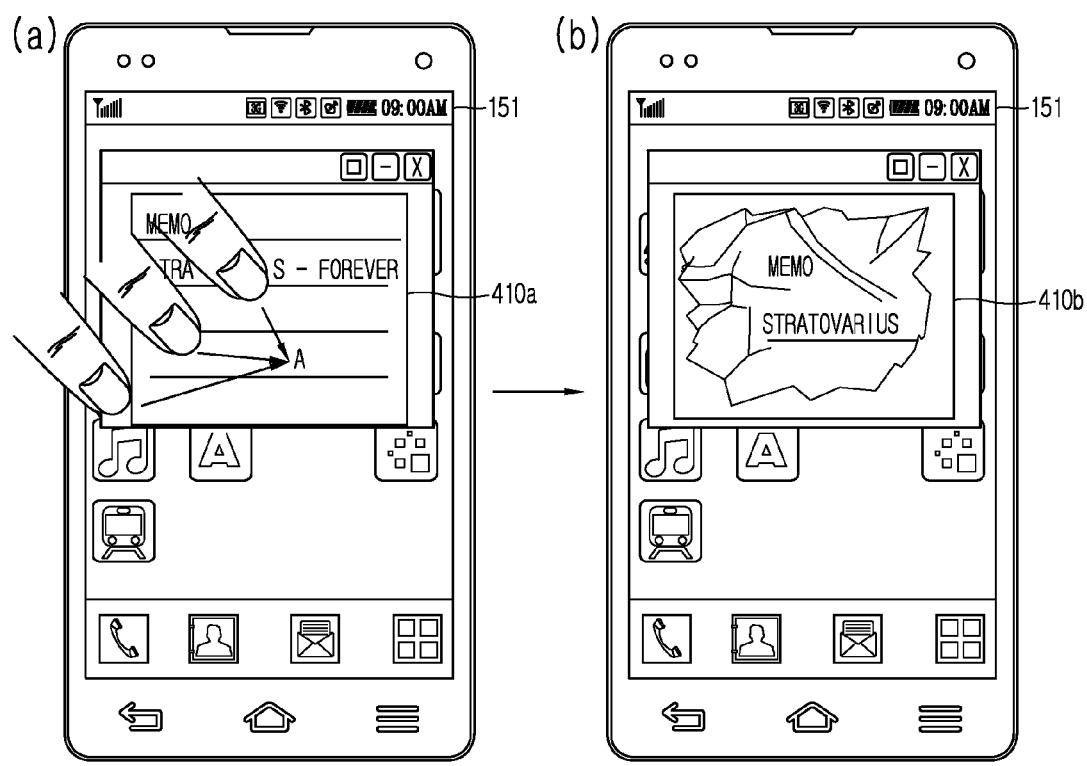
FIG. 4 includes diagrams illustrating an example in which, according to a first embodiment of the present invention, screen information in an application is deleted while being crumpled as if it were a sheet of paper.

A first embodiment of the present invention is described referring to FIG. 3 and FIGS. 4(*a*) and 4(*b*). FIGS. 4(*a*) and 4(*b*) are diagrams illustrating an example in which, according to the first embodiment of the present invention, the screen information in the application is deleted while being crumpled as if it were a sheet of paper.

As illustrated in FIG. 4(*a*), when first screen information 410*a* corresponding to a memo application is output, the controller 180 detects the drag touch input to the first screen information 410*a*.

On the other hand, assume that the texture setting unit sets the texture for the memo application to "paper." The texture is set based on the user input, or based on whether the function that the application has, for example, the editing function, can be executed.

The controller 180 detects a predetermined-type drag touch input that is applied to the first screen information. The controller 180 detects that at least two points, first and second touch points, from which the drag touch input to the first screen information starts to approach each other. For example, when the drag touch input, as illustrated in FIG. 4(*a*), is detected that brings multi touches with a thumb, a forefinger, and a middle finger toward one point, the controller 180, as illustrated in FIG. 4(*b*), switches the first screen information 410*a* to second screen information 410*b* to which the "effect of crumpling a sheet of paper" is applied along a dragging direction A.

The display unit 151 outputs a result of the switch, the second screen information 410*b*. On the other hand, the controller 180 enables the "effect of crumpling a sheet of paper," applied to the second screen information 410*b*, to vary depending on the touch point at which the drag touch input is ended, a distance that the touch is dragged, and the like. For example, if touch ending points corresponding to multiple touch starting points are distant from each other, when the distance that the touch is dragged is short, the effect described above is applied to the second screen information 410*b* to a lesser extent.

If the second screen information 410*b* is output to the display unit 151, the controller 180 executes the control command to delete the second screen information 410*b*. Here, the command to delete the second screen information 410*b* is a control command to delete only the corresponding page, or a control command to end the execution of the memo application itself.

For the control command to end the execution of the memo application itself, the controller 180 controls the display unit 151 in such a manner that the graphic object on the background screen, for example, the icon on a wallpaper screen, which is veiled by the second screen information 410*b*, is viewed.

Only if the "effect of crumpling a sheet of paper" applied to the second screen information 410*b*, exceeds a predetermined reference value, the control command described above is executed. That is, if the "effect of crumpling a sheet of paper," applied to the second screen information 410*b*, is the a predetermined reference value or less, the controller 180 only outputs the second screen information 410*b*, without executing the control command.

On the other hand, the display unit 151 performs highlighting processing, for example, flickering screen processing and color change processing, on the second screen information 410*b* and outputs the result of the processing at the same time when the second screen information 410*b* is output, or at a given interval of time.

Figure 5:
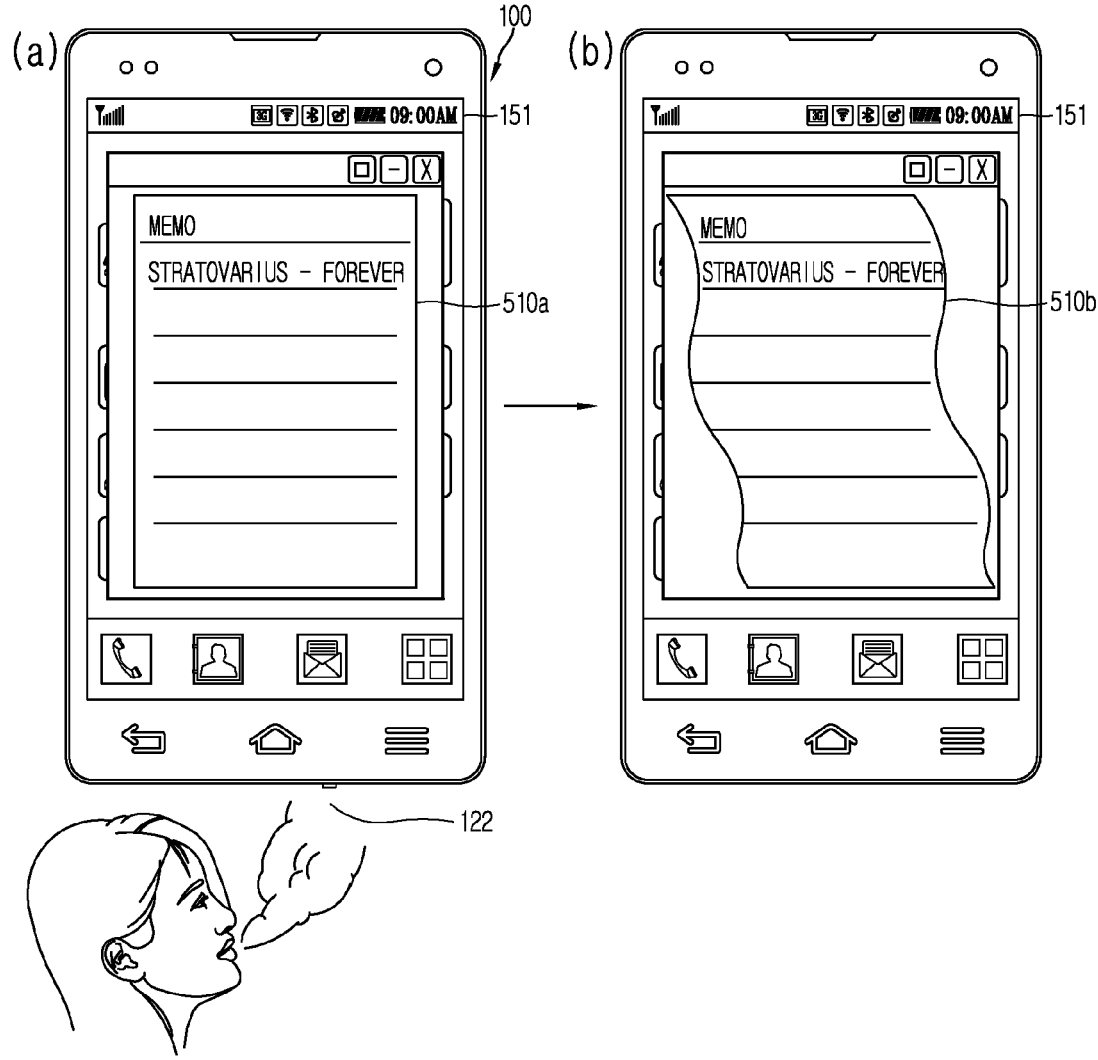
FIG. 5 includes diagrams illustrating an example in which, according to a second embodiment of the present invention, the screen information in the application is deleted while flying as if it were a sheet of paper.

A second embodiment of the present invention is described referring to FIG. 3 and FIG. 5. FIG. 5 includes diagrams illustrating an example in which, according to the second embodiment of the present invention, the screen information in the application is deleted while flying as if it were a sheet of paper.

In FIGS. 5(*a*) and 5(*b*), the texture for the memo application is set to a texture of "paper" by the texture setting unit. When first screen information 510 corresponding to the memo application, as illustrated in FIGS. 5(*a*) and (*b*), is output on the display unit 151, the controller 180 detects the user input (wind) applied the microphone 122 provided in the mobile terminal 100.

If the haptic signal that is input through the microphone 122 is detected in this manner, the controller 180 switches first screen information 510*a* to a second screen information 510*b* to which an effect of a flying sheet of paper is applied, according to the haptic signal that is input.

Only if the effect of a flying sheet of paper applied to the second screen information 510*b* exceeds the predetermined reference value, the controller 150 executes the control command described above. If the haptic signal that is input is the predetermined reference value or less, the controller 180 outputs only the second screen information 510*b*. In contrast, if the haptic signal that is input exceeds the predetermined reference value, the controller 180 deletes the second screen information 510*b* within a given time after the second screen information 510*b* is output.

In addition, the controller applies the "effect of a flying sheet of paper" that varies depending on the size of the haptic signal that is input, to the second screen information 510*b*. That is, if the size of the haptic signal that is input is greater, the "effect of a flying sheet of paper" is applied to a greater extent, and if the size of the haptic signal that is input is smaller, the "effect of a flying sheet of paper" is applied to a lesser extent. On the other hand, if the haptic signal is not further detected when the second screen information 510*b* is output, the controller 150 switches the second screen information 510*b* back to the first screen information 510*a*.

Figure 6:
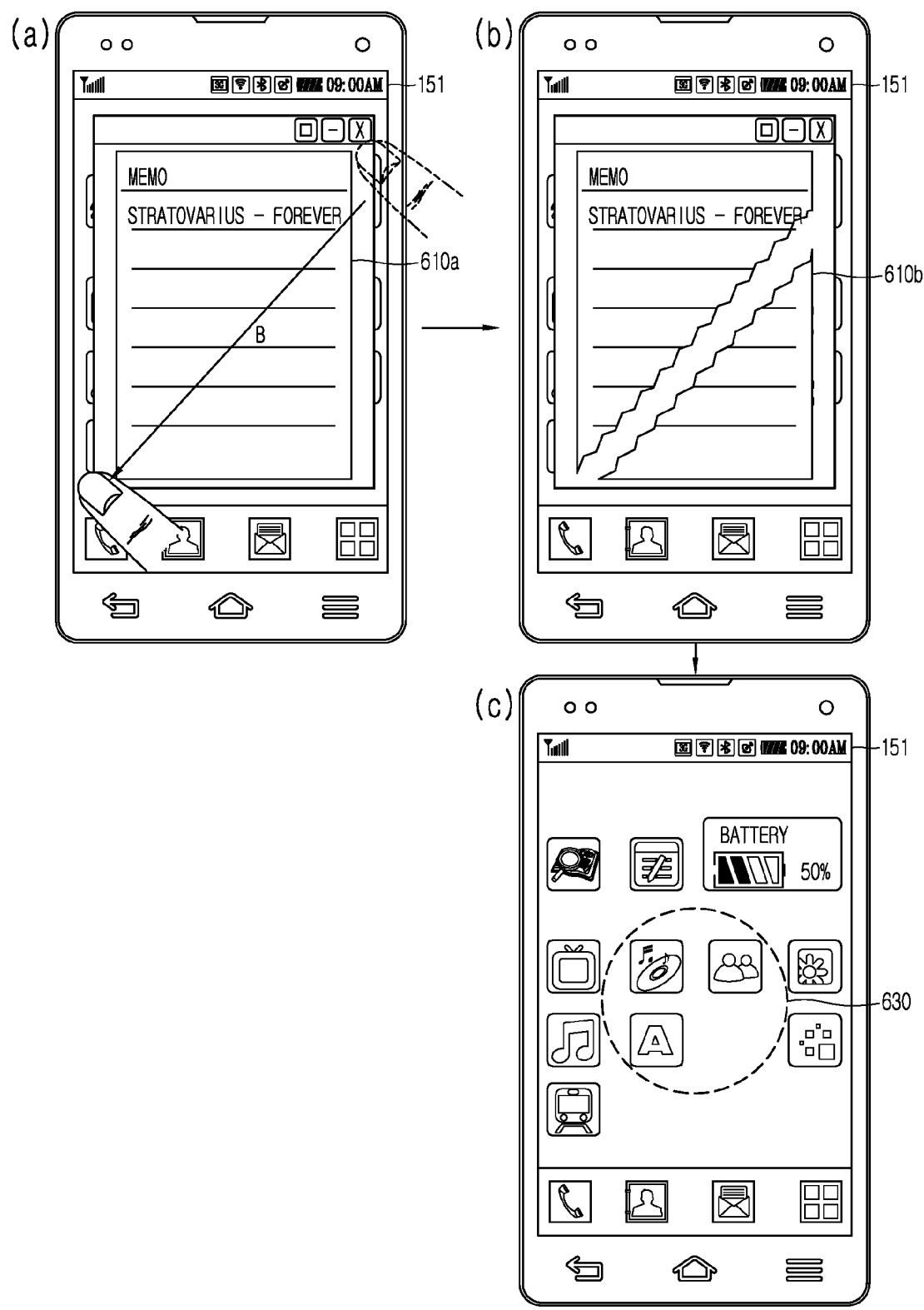
FIG. 6 includes diagrams illustrating an example in which, according to a third embodiment of the present invention, the screen information in the application is deleted while being torn as if it were a sheet of paper.

A third embodiment of the present invention is described referring to FIG. 3 and FIG. 6. FIG. 6 includes diagrams illustrating an example in which, according to the third embodiment of the present invention, the screen information in the application is deleted while being torn as if it were a sheet of paper.

In FIG. 6(*a*)-(*c*), the texture for the memo application is set to a texture of "paper." In state where first screen information 610*a* corresponding to the memo application, as illustrated in FIG. 6(*a*)-(*c*), is output to the display unit 151, the controller 180 detects the drag touch input applied to the first screen information 610*b*.

The controller 180 detects the predetermined-type drag touch input that is applied to the first screen information 610*b*. For example, the controller 180, as illustrated in FIG. 6(*a*), detects the drag touch input in the form of a diagonal line, in which the upper right end of the first screen information 610*b* is the touch starting, and the lower left end of the first screen information 610*b* is the touch ending point. Then, the controller 180, as illustrated in FIG. 6(*b*), switches the first screen information 610*a* to the second screen information 610*b* to which an effect of tearing a sheet of paper is applied along a dragging direction B.

If the second screen information 610*b* is output, the controller 180 executes the control command to delete the second screen information 510*b*. Then, the controller 180 controls the display unit 151 in such a manner that graphic objects 630 on the background screen, for example, icons on the wallpaper screen, which are veiled by the second screen information 610*b*, are viewed as illustrated in FIG. 6(*c*).

In addition, in FIGS. 4-6, the controller 180 can visually move the second screen information into a trash bin icon displayed on the display unit 151 so as to inform the user the second screen information is being deleted.

Figure 7:
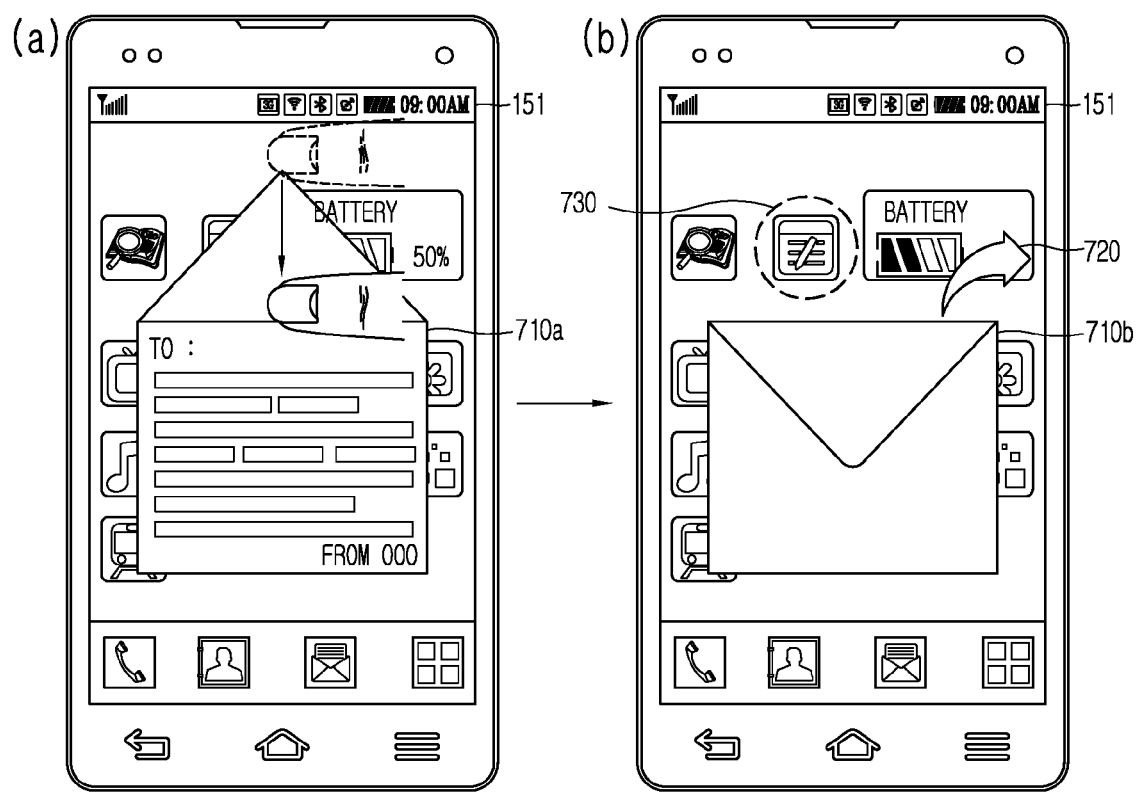
FIG. 7 includes diagrams illustrating an example in which, according to a fourth embodiment of the present invention, the screen information in the application is transmitted while being folded as if it were a sheet of paper.

A fourth embodiment of the present invention is described referring to FIG. 3 and FIG. 7. FIG. 7 includes diagrams illustrating an example in which, according to the fourth embodiment of the present invention, the screen information in the application is transmitted while being folded as if it were a sheet of paper (e.g., like an envelope).

For example, first screen information 710*a* corresponding to a message transmission application, as illustrated in FIGS. 7(*a*) and (*b*), is output to the display unit 151. Here, assume that the texture for the message transmission application is set to a texture of "paper." When the first screen information 710*a* is output, the controller 180 detects the predetermined-type drag touch input that is applied to the first screen information 710*b*.

For example, if it is detected that the first touch point from which the drag touch input to the first screen information 710*a* starts, is moved in a given direction, (for example, a motion that starts from the touch starting point and is oriented downward), the controller 180 switches the first screen information 710*a* to the second screen information 710*b* to which an "effect of folding a sheet of paper" is applied along the given direction.

If the switch is made from the first screen information 710*a* to the second screen information 710*b*, an image is changed, like the letter envelope that is sealed, as illustrated in FIGS. 7(*a*) and (*b*). On the other hand, if it is detected that the drag touch input to the second screen information 710*b* is moved in a given direction, (for example, a motion that is oriented upward from the touch starting point) when the second screen information 710*b* is output, the controller 180 switches the first screen information 710*b* to the second screen information 710*a*. At this time, the image is changed like the sealed letter envelope that is unsealed.

If the second screen information 710*b* is output to the display unit 151, the controller 180 controls the display unit 151 in such a manner that an icon 730 on the wallpaper screen, which is veiled by the first screen information 710*a*, is viewed.

If the second screen information 710*b* is output to the display unit 151, the controller 180 executes the control command to transmit 720 a message included in the second screen information 710*b* to a destination included in the second screen information 710*b*. The transmission of the second screen information 710*b* is performed through a wireless communication unit 110 of the mobile terminal 100.

After detecting touch ending of the predetermined-type touch input (for example, a short touch), or the drag touch input before transmitting 720 the message included in the second screen information 710*b*, the controller 180 performs the transmission control command.

On the other hand, if the destination is not included in the second screen information 710*b*, the controller 180 fetches information, for example, destination information, which is stored in the mobile terminal 100 in a predetermined manner, from a phone number pop-up window.

In addition, the controller 180 performs the control in such a manner that the graphic object (for example, an object in the form of a bar, indicating a transmission rate) indicating the transmission rate is output to the second screen information 710*b*. In addition, the controller 180 presets a type in which the second screen information is transmitted, for example, predetermines which of an email transmission type, a KAKAO TALK transmission type, and an SNS message transmission type is used.

The display unit 151 performs highlighting processing, for example, flickering screen processing and color change processing, on the second screen information 410*b* and outputs the result of the processing, at the same time when the second screen information 710*b* is output, or while the second screen information 710*b* is transmitted.

Figure 8:
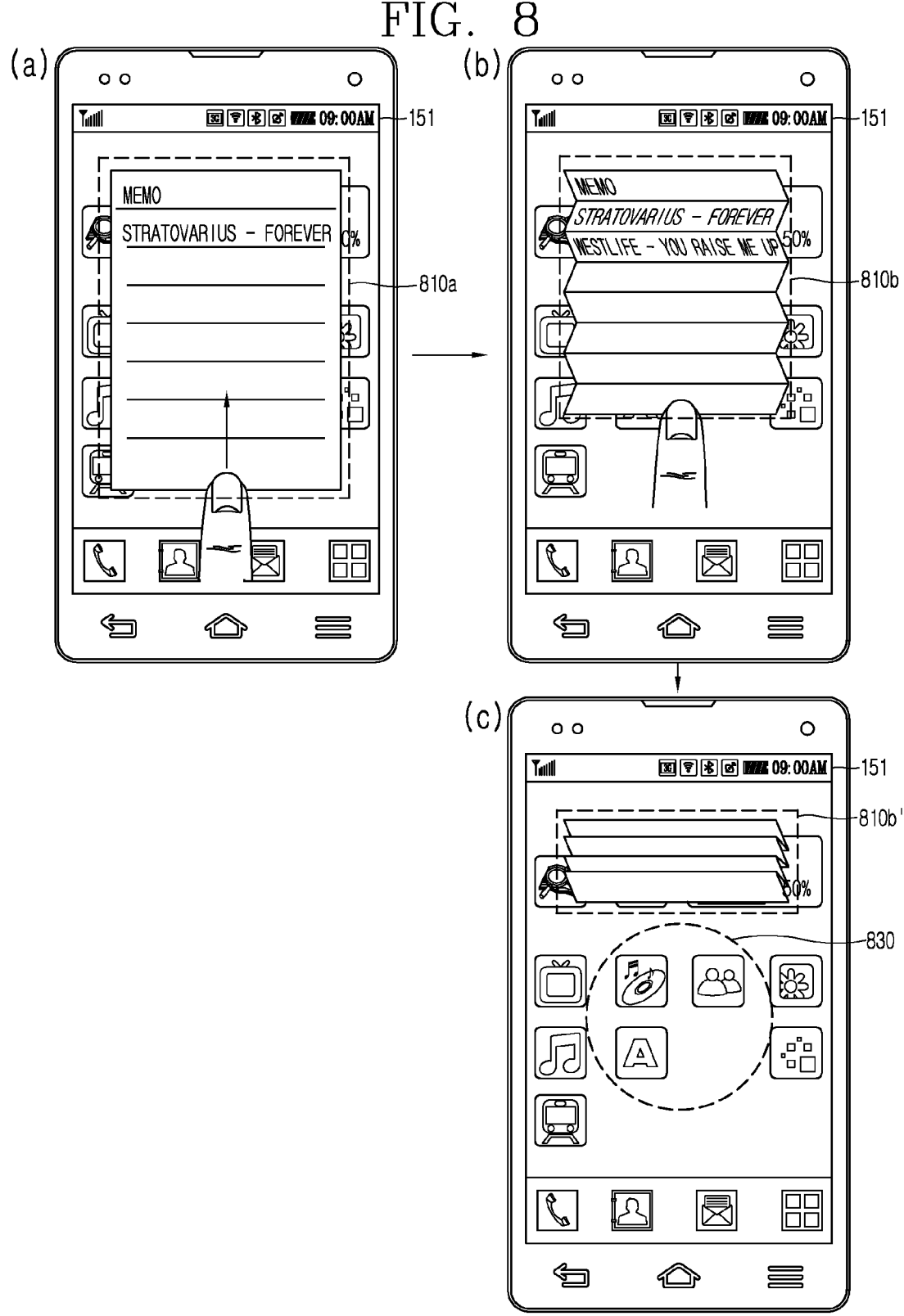
FIG. 8 includes diagrams illustrating an example in which, according to a fifth embodiment, a background screen appears while the screen information in the application is folded as if it were a sheet of paper.

A fifth embodiment of the present invention is described referring to FIG. 3 and FIG. 8. FIG. 8 includes diagrams illustrating an example in which, according to the fifth embodiment, the background screen appears while the screen information in the application is folded as if it were a sheet of paper.

For example, first screen information 810*a* corresponding to the memo application, as illustrated in FIG. 8(*a*), is output to the display unit 151. Here, the texture for the memo application is set to a texture of "paper." The controller 180 detects the predetermined-type drag touch input that is applied to the first screen information 810*a*. The controller 180 detects that the first touch point from which the drag touch input to the first screen information 810*a* starts is moved from the lower end of the first screen information 810*a* to a given direction (for example, an upward direction).

If the drag touch input is detected in this manner, the controller 180, as illustrated in FIGS. 8(*b*) and (*c*), switches the first screen information 810*a* to a second screen information 810*b* and 810*b*' to which an "effect of folding a sheet of paper" is applied along the dragging direction. The effect of folding a sheet of paper in an upward direction, as illustrated in FIG. 8, is applied to the first screen information 810*a* because the dragging direction is a downward to upward direction, but, if the dragging direction is an upward to downward direction, the effect of folding a sheet of paper in a downward direction is applied to the first screen information 810*a*.

Here, the controller 150 receives information on the texture that is set for the application, from the texture setting unit prior to the switch to the second screen information 810*b* and 810*b*', and performs processing that generates the second screen information 810*b*, based on the received information on the texture.

On the other hand, the controller 180 enables the "effect of folding a sheet of paper," applied to the second screen information 810*b* and 810*b*' to vary depending on the touch point at which the drag touch input is ended, the distance that the touch is dragged, and the like.

If the second screen information 810*b*' is output to the display unit 151, the controller 180 controls the display unit 151 in such a manner that graphic objects 830 on the background screen, for example, icons on the wallpaper screen, which are veiled by the second screen information 810*b*, are viewed as illustrated in FIG. 8©. The controller 151 executes directly the icon of the application displayed on a given region of the background screen that is regained because the second screen information 810*b* is output. That is, according to the fifth embodiment, the region of the background screen that is viewed is more regained, maintaining a state in which the memo application is executed, without any change.

On the other hand, if it is detected by the controller 180 that, when the second screen information 810*b* is output, the drag touch input to the second screen information 810*b* starts from the lower end of the second screen information 810*b* and proceeds to move in a given direction (for example, in the downward direction), the controller 180 applies an "effect of unfolding a folded sheet of paper" to the second screen information 810*b*, along the dragging direction. If the distance that the drag touch input is dragged exceeds the predetermined value, the controller 180 switches the second screen information 810*b* back to the first screen information 810*a*.

Figure 9B:
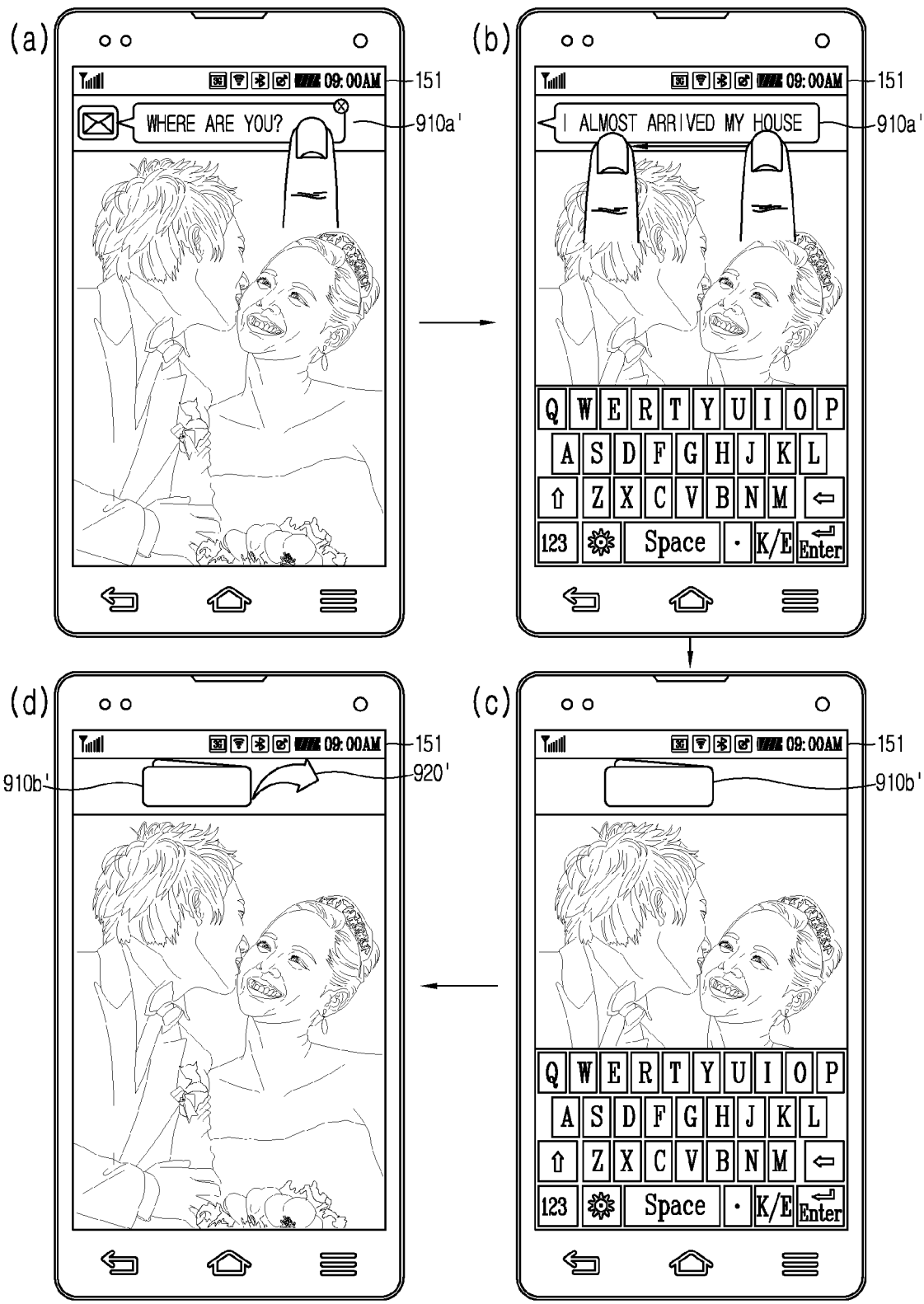

A sixth embodiment of the present invention is described referring to FIG. 3, FIG. 9A and FIG. 9B. FIG. 9A and FIG. 9B are diagrams illustrating an example in which, according to the sixth embodiment, the screen information in the application is transmitted while being folded as if it were a sheet of paper.

For example, first screen information 910*a* corresponding to the memo application, as illustrated in FIG. 9A, is output to the display unit 151. Here, assume that the texture for the memo application is set to a texture of "paper." In addition, the first screen information 910*a* may be a specific page that is separated from the memo application including the multiple pages.

When the first screen information 910*a* is output, the controller 180 detects the predetermined-type drag touch input to the first screen information 910*a*. For example, if it is detected that the first and second touch points from which the drag touch input to the first screen information 910*a* starts is moved in a direction in which they approach each other (for example, two drag movements in which occur concurrently from the left side and the right side toward the middle), the controller 180, as illustrated in FIG. 9A(a) and (b), switches the second screen information 910*a* to second screen information 910*b* to which the "effect of folding a sheet of paper" is applied along the direction described above.

If the second screen information 910*b* is output to the display unit 151, the controller 180, as illustrated in FIG. 9A(c), executes the control command 920 to transmit the message included in the second screen information 910*b* to the destination included in the second screen information 910*b*. The transmission of the second screen information 910*b* is performed through the wireless communication unit 110.

Here, the controller 180 causes the number of times that the "effect of folding a sheet of paper" is applied to vary according to the number of times that the drag touch input described above is applied to the first screen information 910*a*. In addition, the controller 180 determines a transmission type, for example, any one of the email transmission, the KAKAO TALK transmission, and the SNS message transmission, according to the number of times that the "effect of folding a sheet of paper" is applied.

On the other hand, if the destination is not included in the second screen information 910*b*, the controller 180 extracts or gets information, for example, the destination information, which is stored in the mobile terminal 100 in the predetermined manner, from the phone number pop-up window.

In addition, the controller 180 performs the control in such a manner that the graphic object (for example, the object in the form of a bar, indicating the transmission rate) indicating the transmission rate is further output to the second screen information 910*b*. The display unit 151 performs the highlighting processing, for example, the flickering screen processing and the color change processing, on the second screen information 910*b* and outputs the result of the processing, in order to display a state in which the second screen information 910*b* is transmitted.

On the other hand, FIG. 9B includes diagrams illustrating an example in which, with regard to processing of an event that occurs while a different application is executed, the screen information in the application corresponding to the event is transmitted while being folded as if it were a sheet of paper.

If the event, such as receiving of a text message, as illustrated in FIG. 9B(a), occurs while a moving image is reproduced, the first screen information 910*a*' corresponding to the event that occurs is output to one region of the display unit 151.

If the touch input to first screen information 910*a*' is applied when the first screen information 910*a*' is output, the controller 180, as illustrated in FIG. 9B(a) and (b), performs a function relating to a data input to the first screen information 910*a*'. The controller 180 performs the control in such a manner that while maintaining a state where the execution screen of the moving images is output without any change, the function relating to the data input to the first screen information 910*a*' is performed on one region of the display unit 151.

If the predetermined-type drag touch input, for example, the input to the message writing-finished first screen information 910*a*' that, as illustrated in FIG. 9B(b), is dragged from right to left is detected, the controller 180, as illustrated in FIG. 9B(c), switches the first screen information 910*a*' to second screen information 910*b*' to which the "effect of folding a sheet of paper" is applied along the dragging direction.

When the switch to the second screen information 910*b*' is completed, the controller 180 transmits message information included in the second screen information 910*b*' to the destination included in the second screen information 910*b*' and notifies the user about the transmission via an indicator 920. That is, the screen corresponding to the event that occurs is switched to the screen to which the "effect of folding a sheet of paper" is applied, while maintaining the execution screen of the application that is currently executed without any change. As a result, the processing of the event and the response to the event are easily performed.

Figure 10A:
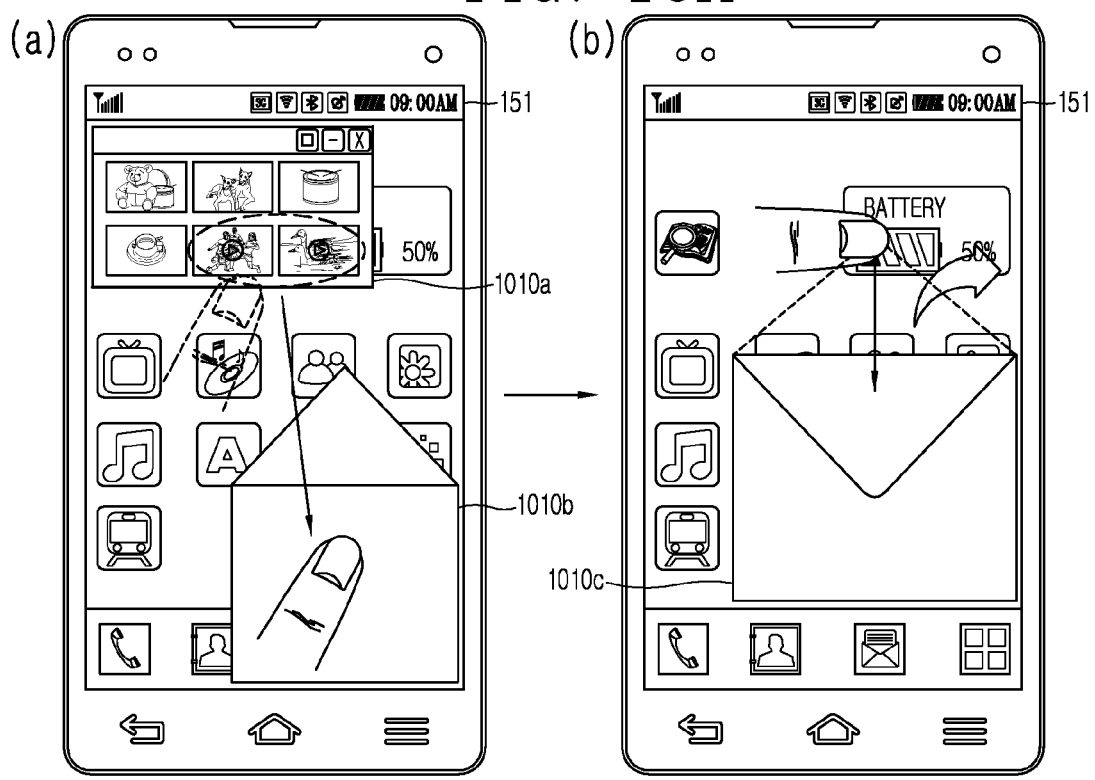
FIG. 10A to FIG. 10D are diagrams illustrating examples in which the effects described above are applied to the multiple items of screen information in the multiple applications.
Figure 10B:
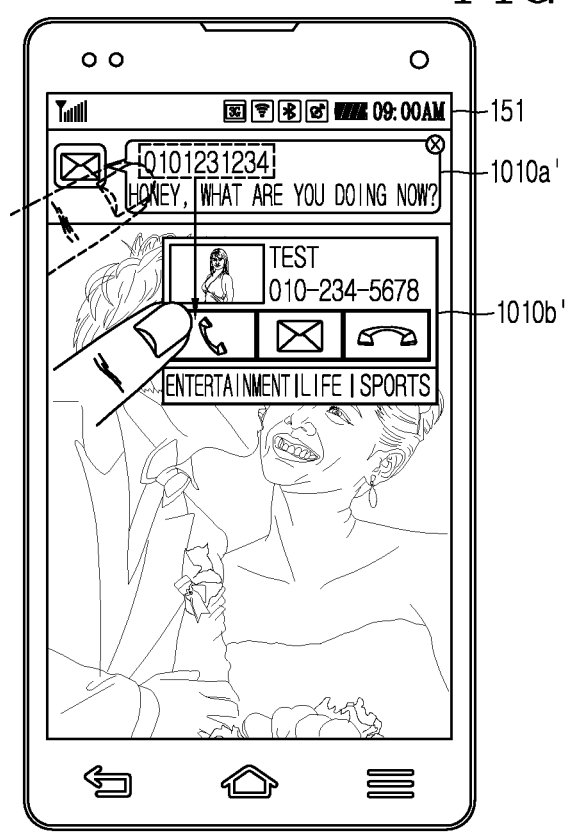

A seventh embodiment of the present invention is described referring to FIG. 3, FIG. 10A to FIG. 10D. FIG. 10A and FIG. 10B are diagrams illustrating examples in which, according to the seventh embodiment, the effects described above are applied to the items of screen information in the multiple applications.

Referring to FIG. 10A, the display unit 151 outputs first screen information 1010a corresponding to a first application and third screen information corresponding 1010b to a second application. The first screen information 1010a and the third screen information 1010b, as illustrated in FIG. 10A, are the execution screens of the first and second applications, respectively. In addition, first screen information 1010a' and third screen information 1010b', as illustrated in FIG. 10B, are the items of screen information relating to the events that occur while the application is executed.

Referring to FIG. 10A(a), when the first screen information 1010a and the third screen information 1010b are output to the display unit 151, the controller 180 detects the predetermined-type drag touch input to the first screen information 1010a. If the drag touch input is ended on at least one part of the region to which the third screen information 1010b is output, the controller 180 executes the control command relating to the second application, based on the data included in the first screen information 1010a.

For example, if items selected from among the multiple items included in the first screen information 1010a, as illustrated in FIG. 10A(a) and (b), are dragged into the third screen information 1010b, the controller 180 performs the control in such a manner that the displayed items are displayed on the third screen information 1010b and in FIG. 10A, the items are transmitted in a message.

On the other hand, in FIG. 10B, when the first screen information 1010a' and the third screen information 1010b' are output to the display unit 151, the controller 180 detects the user drag touch input. If the drag touch input is detected, the controller 180 executes the application corresponding to the third screen information 1010b' by using the data included in the first screen information 1010a' as information that is received in the third screen information 1010b'.

For example, if the predetermined-type drag touch input, as illustrated in FIG. 10B, is detected, the controller 180 retrieves phone number information included in the first screen information 1010a', corresponding to the event that occurs, and executes a function (for example, placing a call) included in the third screen information 1010b'.

Referring back to FIG. 10A, when the selected items are displayed on the third screen information 1010b, the controller 180, as illustrated in FIG. 10A(a), detects the predetermined-type drag touch input to the third screen information 1010b. If the drag touch input is detected, the controller 180, as described above referring to FIG. 7, switches the third screen information 1010b to second screen information 1010c to which the "effect of folding a sheet of paper" is applied. If the switch is made from the third screen information 1010b to the second screen information 1010c in this manner, the image is changed, like the letter envelope that is sealed, as illustrated in FIG. 10A (b).

On the other hand, the controller 150 receives information on the texture that is set for the second application, from the texture setting unit prior to the switch to the second screen information 1010c and generates the second screen information 1010c, based on the received information on the texture. Here, the texture for the second application is set to a texture of "paper."

If the second screen information 1010c is output to the display unit 151, the controller 180 transmits the message included in the third screen information 1010b to the destination included in the third screen information 1010b. Operation of the controller 180 and operation of the display unit 151 that relate to this are described in detail above referring to FIG. 7, and therefore descriptions thereof are omitted here.

Figure 10C:
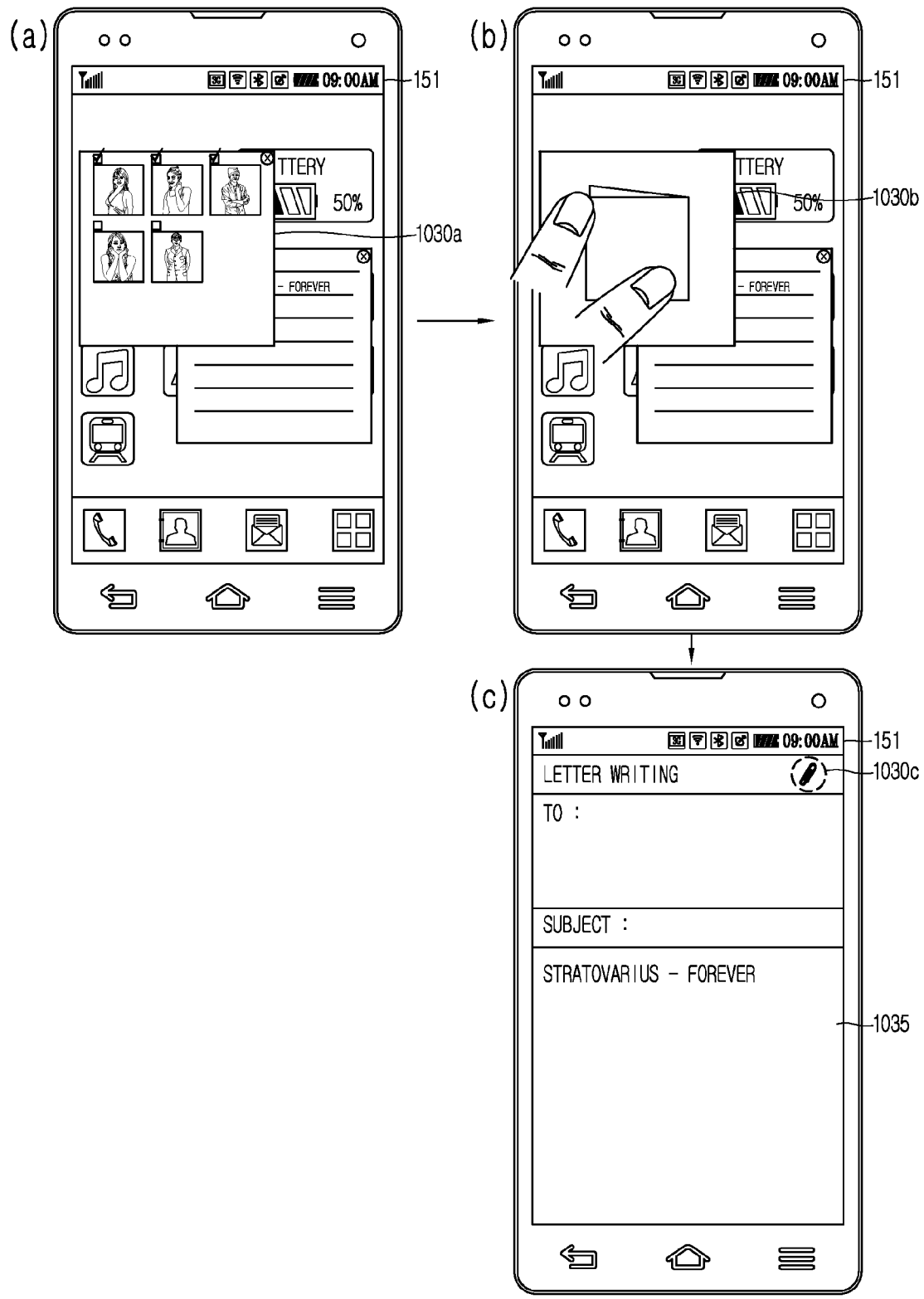

In FIG. 10C, when first screen information 1030a corresponding to the first application is output, the controller 180 recognizes the items that are selected by the user input from among the particular items included in the first screen information 1030a. When the controller 180 recognizes the selected items, the controller 180 detects the predetermined-type drag touch input (for example, the drag touch input that is in the right to left direction or in the left to right direction). If the drag touch input is detected as illustrated in FIG. 10C(b), the controller 180 switches the first screen information 1030a to the second screen information 1030b to which the "effect of folding a sheet of paper" is applied, as described above referring to FIG. 9A.

If the second screen information 1030b is output to the display unit 151, the controller 180, as illustrated in FIG. 10C(c), automatically executes an email application that is accompanied by the selected particular items included in the second screen information 1030b, as an attached electronic file. That is, the wallpaper screen is switched to an execution screen 1035 of the email application.

The controller 180 executes a varying transmission type application according to the number of times that the "effect of folding a sheet of paper" is applied to the second screen information 1030b, that is, the number of times that the second screen information 1030b is folded. For example, if the first screen information 1030a is folded one time, the second screen information 1030b is output and the email application that is accompanied by the selected items included in the second screen information 1030b, as the attached electronic file, is executed. If the first screen information 1030a is folded two to three times, the second screen information 1030b is output and the SNS message application that is accompanied by the selected items included in the second screen information 1030b as the attached electronic file is executed.

An indicator 1030c indicating that the second screen information 1030b is attached is displayed on the display unit 151. If the touch input to the indicator 1030c is detected, the controller 180 performs the control in such a manner that the selected items included in the second screen information 1030b, as attached, are displayed on the display unit 151.

Figure 10D:
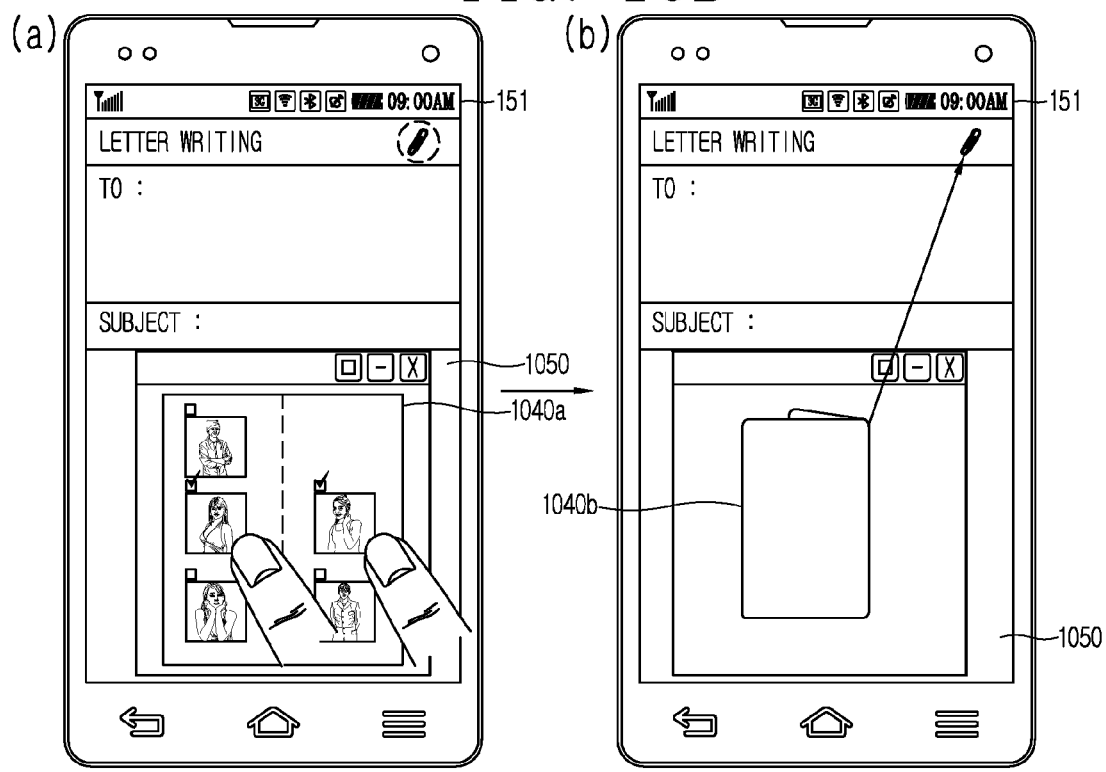

In FIG. 10D(a), for example, when first screen information 1040a corresponding to a gallery application and third screen information 1050 corresponding to the email application are output to the display unit 151, the controller 180 recognizes the items selected by the user input from among the particular items included in the first screen information 1040a. When the controller 180 recognizes the selected items, the controller 180 detects the predetermined-type drag touch input to the first screen information 1040a (for example, the drag touch input that is in the right to left direction or in the left to right direction. Then, referring to FIG. 10D(b), the controller 180, as described above, switches the first screen information 1040a to second screen information 1040b to which the "effect of folding a sheet of paper" is applied.

If the second screen information 1040b is output to the display unit 151, the controller 180, as illustrated in FIG. 10D, executes the control command to enable the selected items included in the second screen information 1030b, as the attached electronic file, to accompany the third screen information 1050. The indicator 1030c indicating that the second screen information 1030b is attached is output to the display unit 151, when the highlighting effect, for example, the flickering screen effect or the different color display effect is applied.

Figure 11:
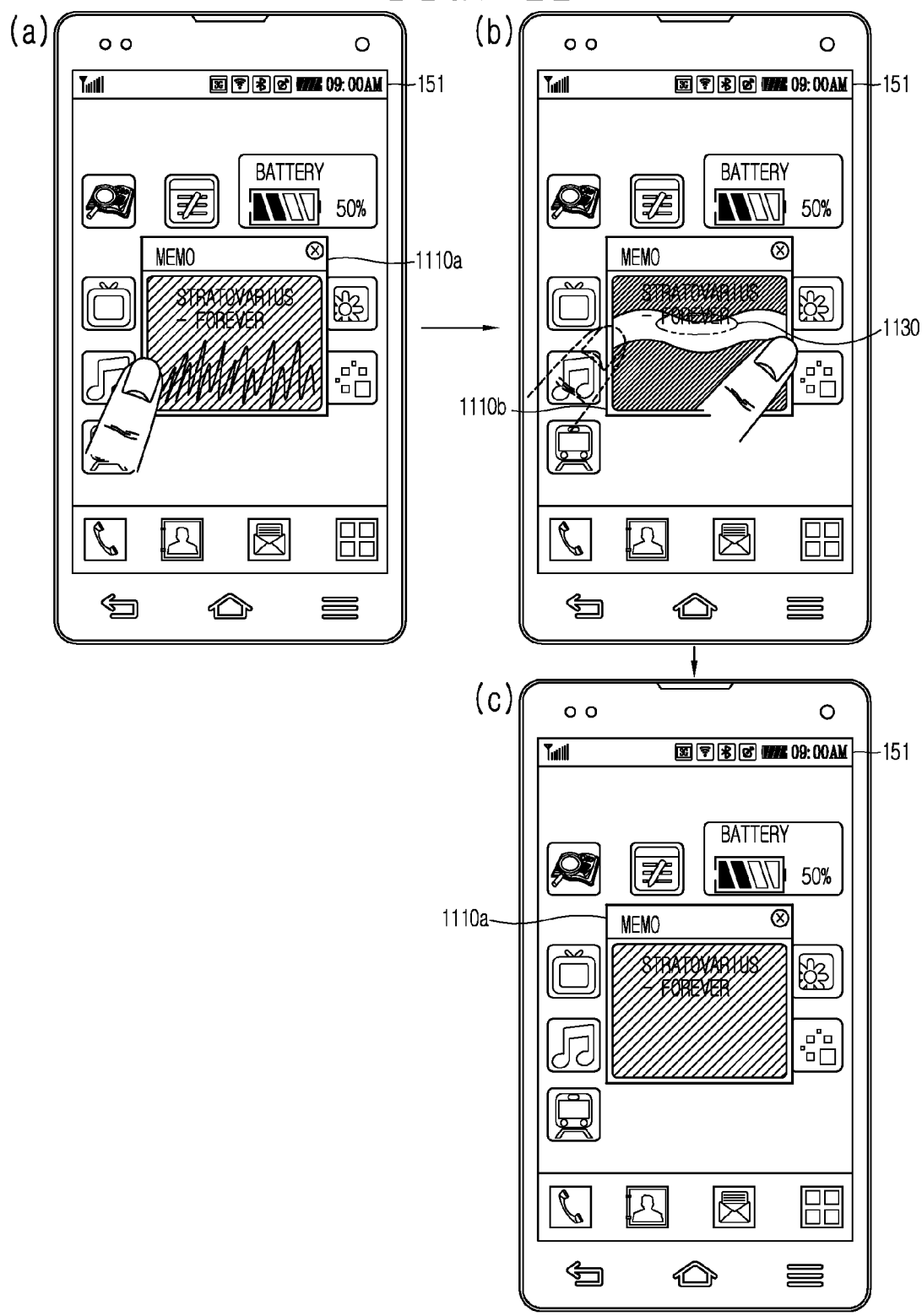
FIG. 11 includes diagrams illustrating an effect in which, according to an eighth embodiment, transparency of the screen information in the application is adjusted as if it were a glass window.

An eighth embodiment of the present invention is described referring to FIG. 3 and FIG. 11. FIG. 11 includes diagrams illustrating an effect in which, according to the eighth embodiment, transparency of the screen information in the application is adjusted as if it were a glass window.

The display unit 151, as illustrated in FIG. 11(a), outputs first screen information 1110a corresponding to the application, for example, the execution screen of the memo application or image display application (image viewer). The controller 180 receives the information on the texture that is preset for the memo application from the texture setting unit. In FIG. 11, the texture for the memo application is set to a texture of a "glass window."

The first screen information 1110a, as illustrated in FIG. 11(a), is output to the display unit 151, in which an effect of layering an opaque window as a cover image is applied. Here, the cover image means an image that is formed to block or limit exposure of a specific screen or a specific image. Such a cover image can be realized as a translucent or opaque layer image.

The controller 180 detects the predetermined-type drag touch input to the first screen information 1110a. For example, as illustrated in FIG. 11(b), if the drag touch input of which the starting point is the first touch point within the first screen information 1110a is detected, the controller 180 performs the switch to second screen information 1110b to which an "effect of making a transparent glass window," is applied along the dragging direction and a track of the drag touch input that are detected.

That is, the first screen information 1110a is switched by the controller 180 to the second screen information 1110b to which an effect of increasing transparency of an opaque glass window by rubbing it with a user's finger, which is possible with the application of the user drag touch, is applied.

The controller 180 controls the display unit 151 in such a manner that hid information 1130, such as the text and the graphic object, is viewed on the region of the second screen information 1110b, to which the "effect of making a transparent glass window is applied. That is, the controller 180 exposes at least one part of the region that is veiled by the cover image in the first screen information 1110a.

The controller 180 outputs the second screen information 1110b that varies in the extent to which the "effect of making a transparent glass window" is applied, according to the number of times that the drag touch input is applied. For example, the controller 180 outputs the second screen information 1110b that results from making more transparently the region to which the touch input is applied two or more times than the region to which the touch input is one time in the first screen information 1110a.

If a predetermined time is exceeded when the second screen information 1110b is output, the controller 180 switches the second screen information 1110b back to the first screen information 1110a. That is, the controller 180, as illustrated in FIG. 11(c), returns the second screen information 1110b back to the first screen information 1110a to which an "effect of blowing on a glass window" is applied. Accordingly, the hid information 1130 that is exposed is covered back with the image.

Figure 12A:
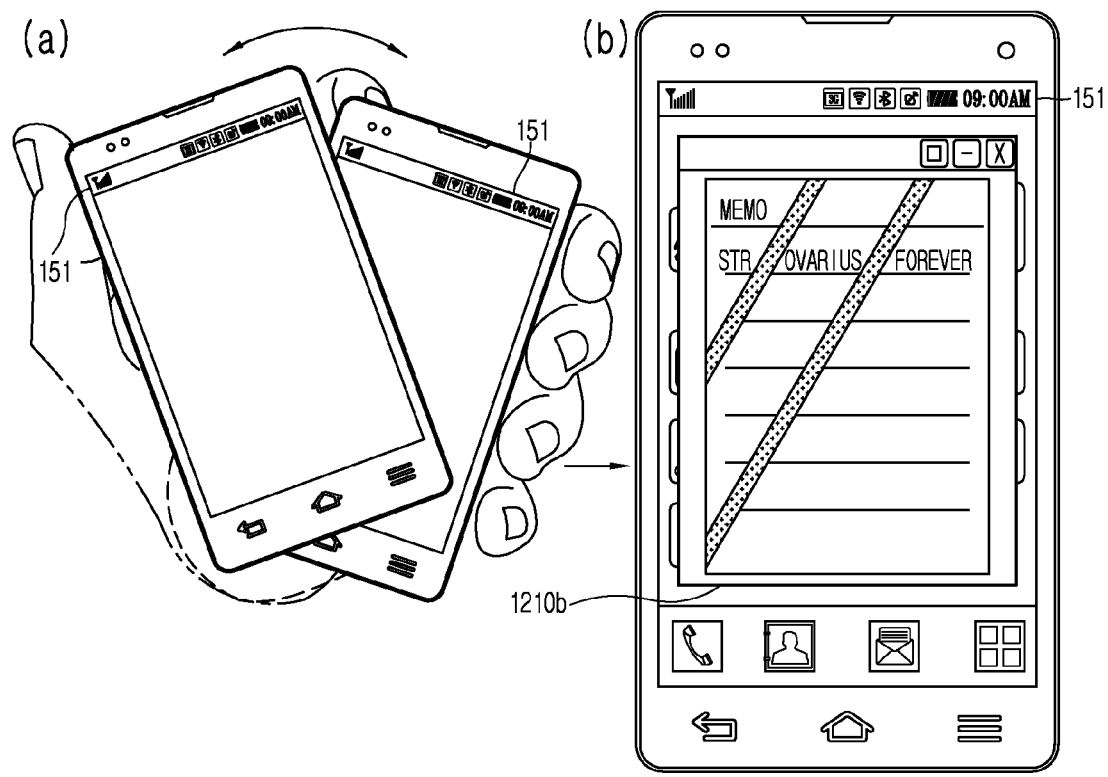
FIG. 12A and FIG. 12B are diagrams illustrating an effect in which, according to a ninth embodiment or according to a tenth embodiment, the screen information in the application is reflected or broken if it were a glass.
Figure 12B:
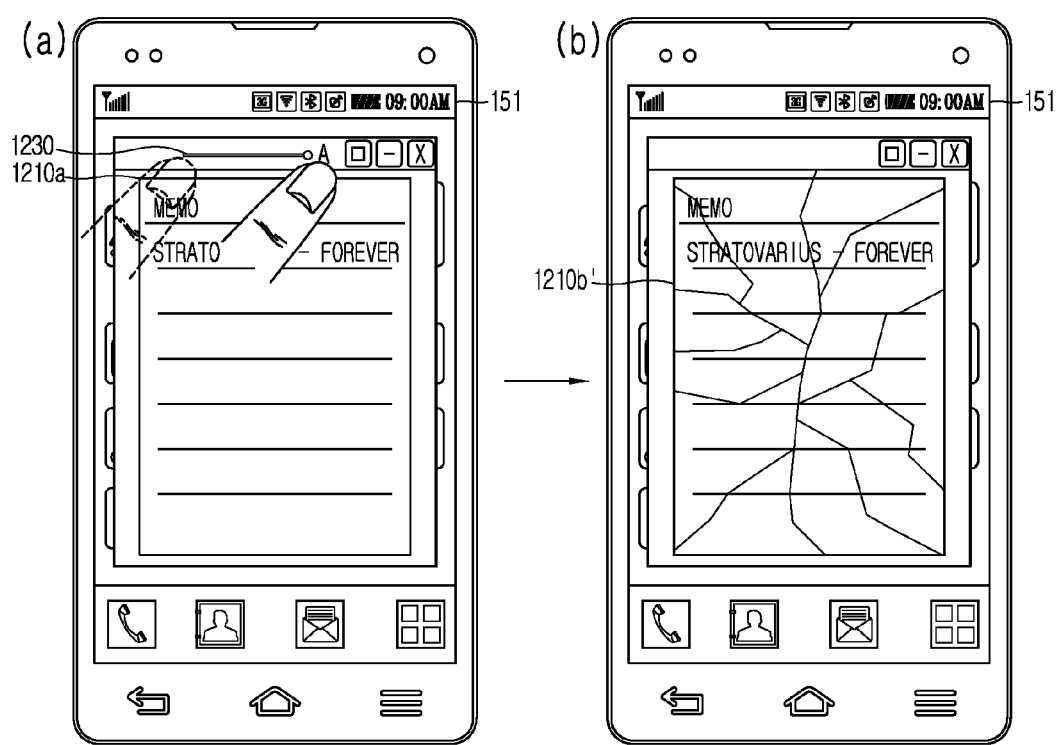

A ninth embodiment and a tenth embodiment of the present invention are described referring to FIG. 3, FIG. 12A and FIG. 12B. FIG. 12A includes diagrams illustrating an effect in which, according to the ninth embodiment, the screen information in the application is reflected if it were a glass. FIG. 12B includes diagrams illustrating an effect in which, according to the tenth embodiment, the screen information in the application is broken if it were a glass.

The controller 180 receives the information on the texture that is set for the memo application from the texture setting unit. In FIG. 12A and FIG. 12B, the texture for the memo application is set to a texture of "glass." The controller 180 determines the distinctiveness of the texture of glass to be applied to the screen information that is output, based on the received information on the texture.

Referring to FIG. 12A, when the first screen information corresponding to the memo application is output to the display unit 151, the controller 180, as illustrated in FIG. 12A(a), detects the vibration applied to the mobile terminal or the inclined state of the mobile terminal through the sensing unit 140 in FIG. 1.

If the vibration applied to the mobile terminal or the inclined state of the mobile terminal is detected, the controller 180 switches the first screen information to second screen information 1210b to which an "effect of reflecting light off a glass" (for example, the highlighting effect) is applied according to strength of the detected vibration or an angle of the mobile terminal being inclined as shown in FIG. 12A(b).

The controller 180 causes the reflection effect, applied to the second screen information 1210b, to vary according to the angle of the mobile terminal be inclined, an amount of change, the number of times that the vibration occurs, a frequency at which the vibration, and others, which are detected through the sensing unit 140.

Referring to FIG. 12B(a), when the first screen information 1210a corresponding to the memo application is output to the display unit 151, the controller 180 detects the touch input to the first screen information 1210a. For example, the controller 180 detects the touch input to the first screen information 1210a, particularly, the touch point, the extent of the touch pressure, the amount of touch time, and the dragging direction.

If the touch input to the first screen information 1210a meets the predetermined reference, the controller 180 switches the first screen information 1210a to second screen information 1210b' to which an "effect of breaking a glass" is applied as shown in FIG. 12B(b). Here, the meeting of the predetermined reference means that, for example, the pressure of the touch input applied to the first screen information 1210a exceeds the predetermined value or the predetermined time.

Here, even though the switch is made from the first screen information 1210a to the second screen information 1210b', the controller 180 maintains the text or the image included in the first screen information, without any change. If the touch input is changed from the first touch to the second touch when the second screen information 1210b' is output, the controller 180 switches the second screen information 1210b' corresponding to the first touch to the third screen information corresponding to the second touch.

Here, the third screen information is screen information to which an effect different from the effect applied to the second screen information is applied, or to which a texture different to the texture applied to the second screen information is applied. For example, if the second touch different from the touch input is detected after the touch input to the first screen information 1210a meets the predetermined reference and thus the switch is made to the second screen information 1210b' to which the "effect of breaking a glass" is applied, the second screen information 1210b' is switched to the third screen information to which the "effect of tearing a sheet of paper" is applied.

In addition, for example, the controller 180 detects the predetermined-type touch input to the graphic object, for example, a control bar 1230, displayed on one region of the first screen information 1210a. If it is detected that the drag touch input applied to the control bar 1230 displayed on the one region of the first screen information 1210a is moved in a given direction, the controller 180 moves a moving element A on the control bar 1230 along the given direction.

If the moved graphic object, that is, the moving element A on the control bar 1230 is moved out of a reference region, the controller 180 switches the first screen information 1210a to the second screen information 1210b' to which the "effect of breaking a glass" is applied. If the moved graphic object, that is, the moving element A on the control bar 1230 is moved within the reference region, the controller 180 switches the first screen information 1210a to the second screen information to which the "effect of adjusting transparency of a glass" applied in order to correspond to the movement of the moving element A.

The control bar 1230 is a control object for adjusting the transparency of the texture of the glass that is set for the first screen information 1210a. For example, if it is detected that the moving element A on the control bar 1230 is moved from left to right (or is moved from right to left), the controller 180 performs the control in such a manner that an output screen of the first screen information 1210a is made more transparent. In contrast, if it is detected that the moving element A on the control bar 1230 is moved from right to left (or is moved from left to right), the controller 180 performs the control in such a manner that the output screen of the first screen information 1210a is made more opaque.

In addition, the control bar 1230 may be the control object for controlling opening and closing of the glass window that is formed as the cover image of the first screen information 1210a. For example, if it is detected that the moving element A on the control bar 1230 is moved to from left to rightmost (or is moved from right to leftmost), the controller 180 switches the first second screen information 1210a to the second screen information 1210b' to which the "effect of breaking a glass" is applied.

After the second screen information 1210b' is output, the controller 180 controls the display unit 151 in such a manner that the cover image disappears on the first screen information 1210a and the text or the image that is hid (or looks opaque) is output clearer. According to another embodiment, after the second screen information 1210b is output, the controller 180 may end the memo application that is executed.

Figure 13:
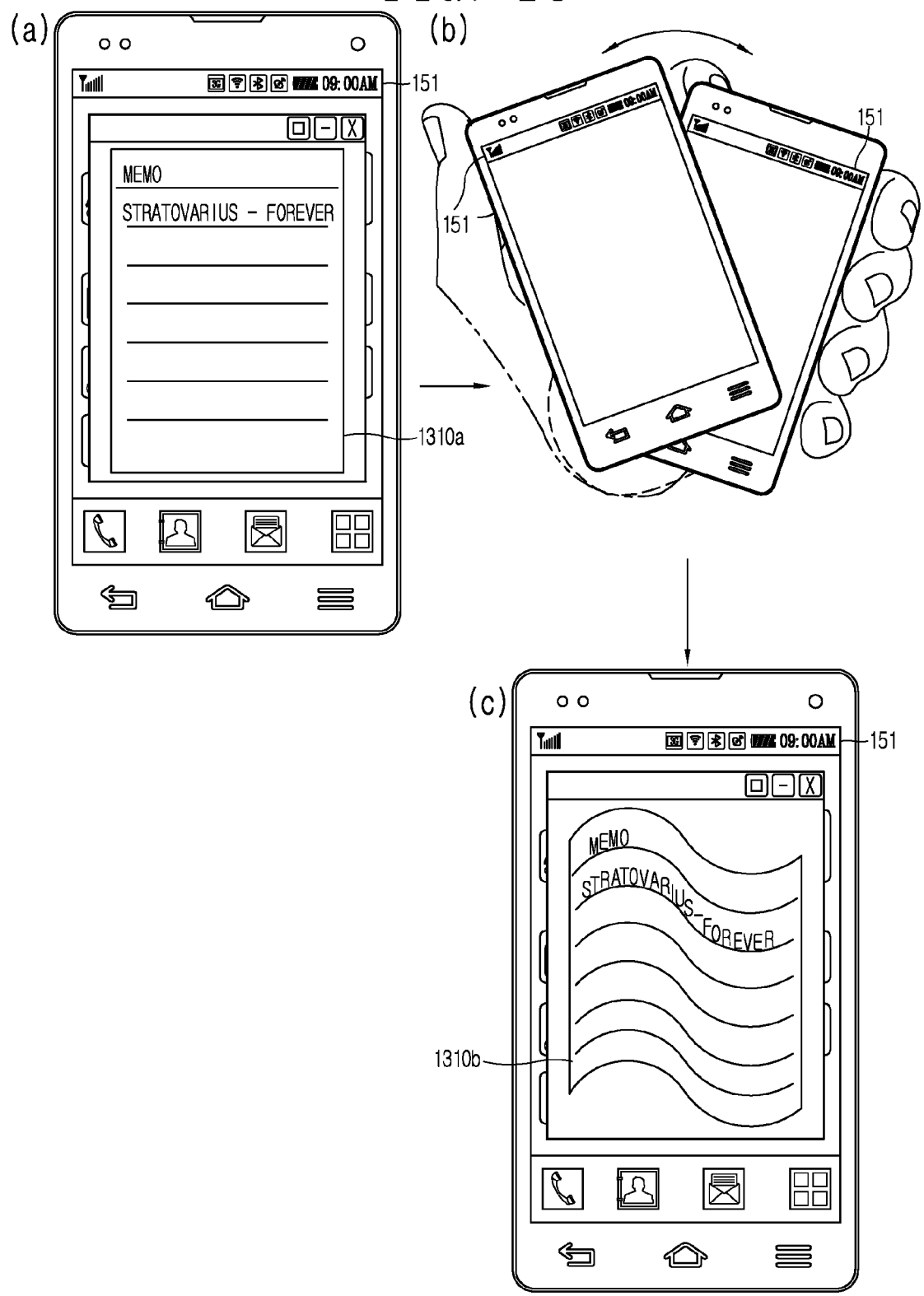
FIG. 13 includes diagrams illustrating an example in which, according to an eleventh embodiment, the screen invention in the application is deleted while rippling as if it were a wave.

An eleventh embodiment of the present invention is described referring to FIG. 3 and FIG. 13. FIG. 13 includes diagrams illustrating an example in which, according to the eleventh embodiment, the screen information in the application is deleted while rippling as if it were a wave. First screen information 1310a corresponding to the memo application, as illustrated in FIG. 13(a), is output to the display unit 151.

The controller 180 receives the information on the texture that is set for the memo application from the texture setting unit. In FIG. 13, the texture for the memo application is set to a texture of "water." When the first screen information 1310a is output, the controller 180 detects the inclined state of the mobile terminal through the sensing unit 140 as shown in FIG. 13(b). If the inclined state of the mobile terminal is detected, the controller 180 switches the first screen information 1310a to second screen information 1310b to which an effect of making a rippling wave is applied according to the number of times that the inclined state of the mobile terminal is detected, the detected direction in which the mobile terminal is inclined, and the detected angle at which the mobile terminal is inclined as shown in FIG. 13(c).

The controller 180 performs the control in such a manner that the second screen information 1310b varies according to the number of times that the inclined state of the mobile terminal is detected, the detected direction in which the mobile terminal is inclined, and the detected angle at which the mobile terminal is inclined.

If the second screen information 1310b is output to the display unit 151, the controller 180 ends the execution of the memo application or executes the control command to delete a specific page corresponding to the second screen information 1310b. In addition, only if any one of the number of times that the inclined state is detected, the detected direction and the detected angle exceeds the predetermined reference value, the controller 180 provides the setting in such a manner that the ending of the execution of the application or the deletion of the specific page is performed.

Figure 14:
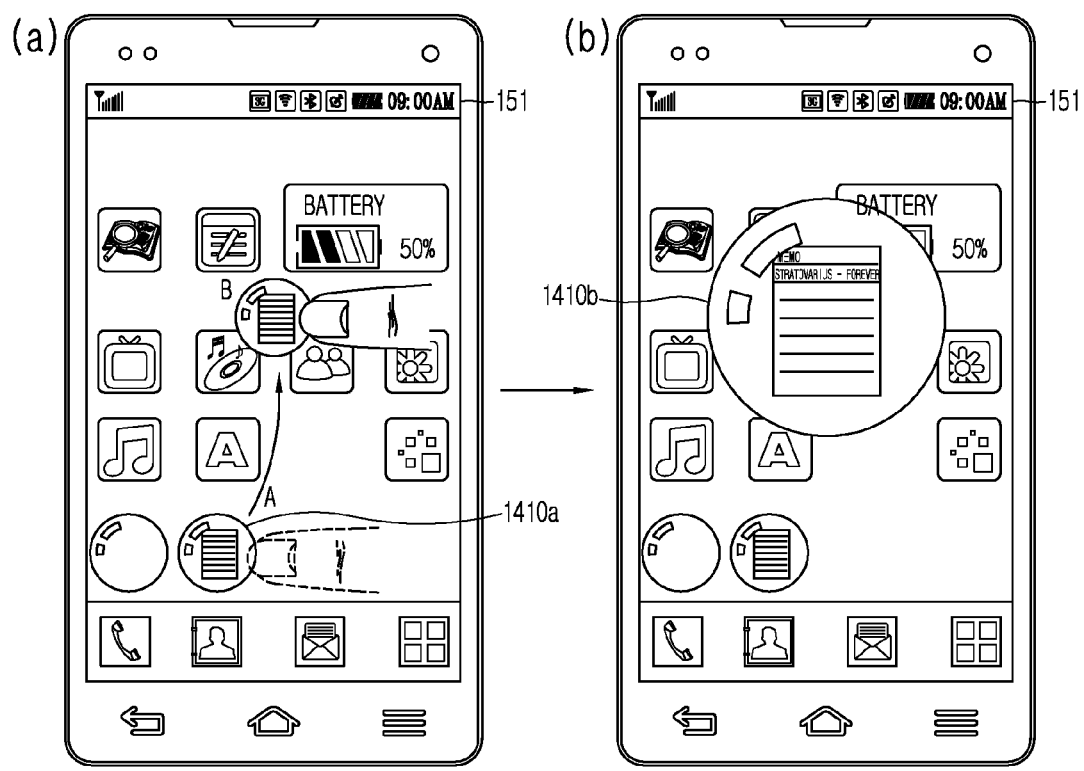
FIG. 14 includes diagrams illustrating an example in which, according to a twelfth embodiment, the screen information in the application is executed while spreading as if it were a drop of water.

A twelfth embodiment of the present invention is described referring to FIG. 3 and FIG. 14. FIG. 14 includes diagrams illustrating an example in which, according to the twelfth embodiment, the screen information in the application is executed while spreading as if it were a drop of water.

As illustrated in FIG. 14, the first screen information 1410a corresponding to the memo application is output to the display unit 151. For example, the first screen information 1410a, as illustrated in FIG. 14(a), may be an icon of the application displayed on the wallpaper screen of the mobile terminal. The attribute of the first screen information 1410a may be expressed as the graphic object that is the cover image in the shape of a water drop displayed on an icon of a specific application.

The controller 180 receives the information on the texture that is set for the memo application from the texture setting unit. In FIG. 14, the texture for the memo application is set to a texture of a "water drop." When the first screen information 1410a is output, the controller 180 detects the predetermined-type drag touch input applied to the first screen information 1410a. For example, as illustrated in FIG. 14(a), if it is detected within the display unit 151 that one region of the first screen information 1410a is dragged from a touch starting point A to a touch ending point B, different from the touch starting point A, the controller 180 moves the first screen information 1410a along a direction in which the one region is dragged as shown in FIG. 14(b). At this time, the first screen information 1410a, as is output, is maintained at the touch starting point A.

If the touch input applied to the display unit 151 is ended when the first screen information 1410a is moved, the controller 180 outputs second screen information 1410b to which the "effect of spreading a water drop" is applied, to the touch ending point B. Here, the second screen information 1410b may be the execution screen of the application corresponding to the first screen information 1410a.

The controller 180 performs the control in such a manner that the background screen of the second screen information 1410b is output in a predetermined mode (for example, a first mode, or a second mode). For example, in the first mode, the background screen of the second screen information 1410b is set to a user-designated background screen, and in the second mode, the background of the second screen information 1410b is set to a transparent screen, that is, the wallpaper screen of the display unit 151, as it is.

If the predetermined-type drag touch input is again applied to the second screen information 1410b when the second screen information 1410b is output, the controller 180 ends the execution of the second screen information 1410b, or deletes the second screen information 1410b. At this time, if the editing function is performed on the second screen information 1410b, the controller 180 may store edited data in a predetermined memory.

Figure 15A:
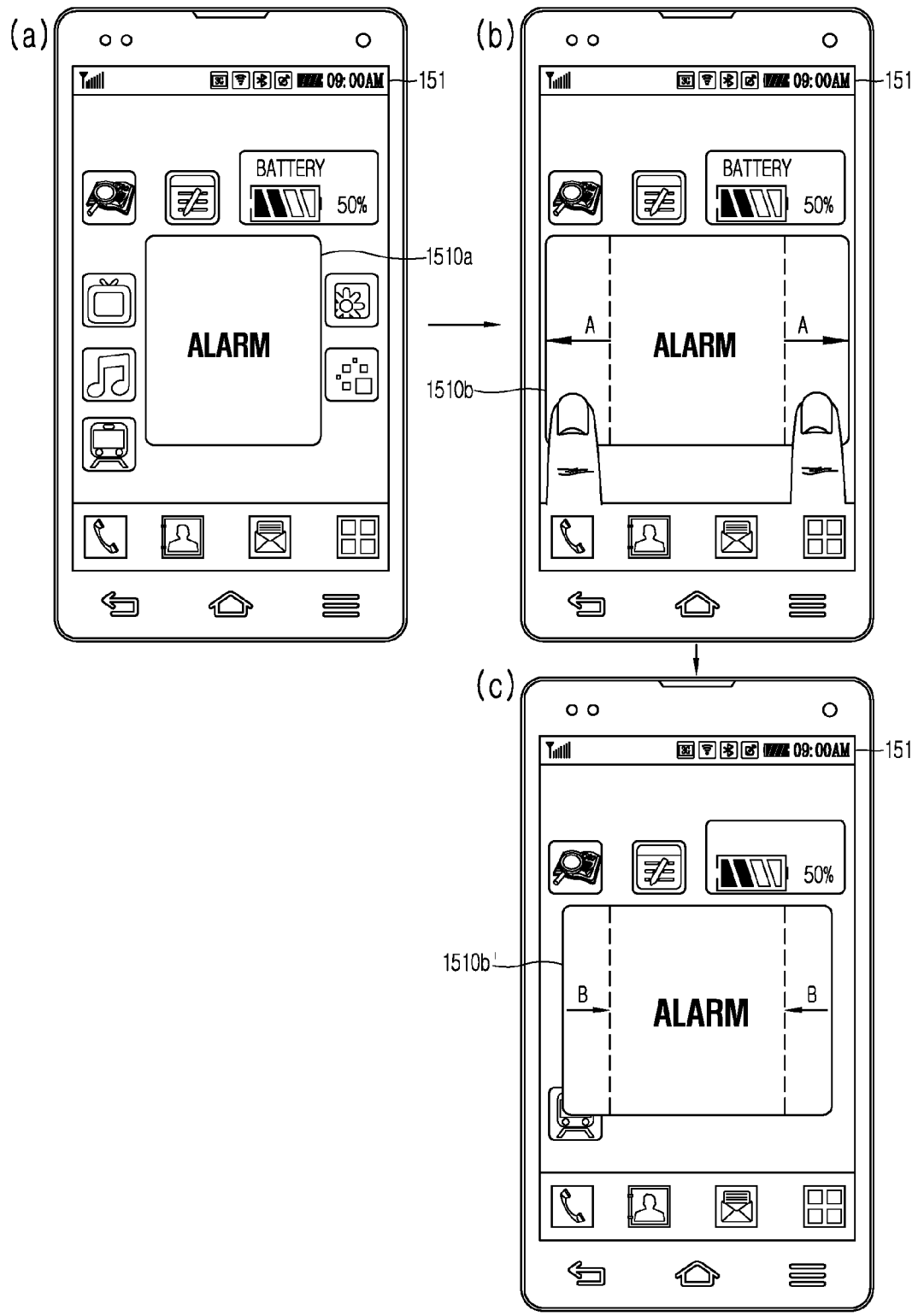
FIG. 15A to FIG. 15B are diagrams illustrating examples in which, according to a thirteenth embodiment, the screen information in the application outputs an alarm while expanding and contracting as if it were a rubber.
Figure 15B:
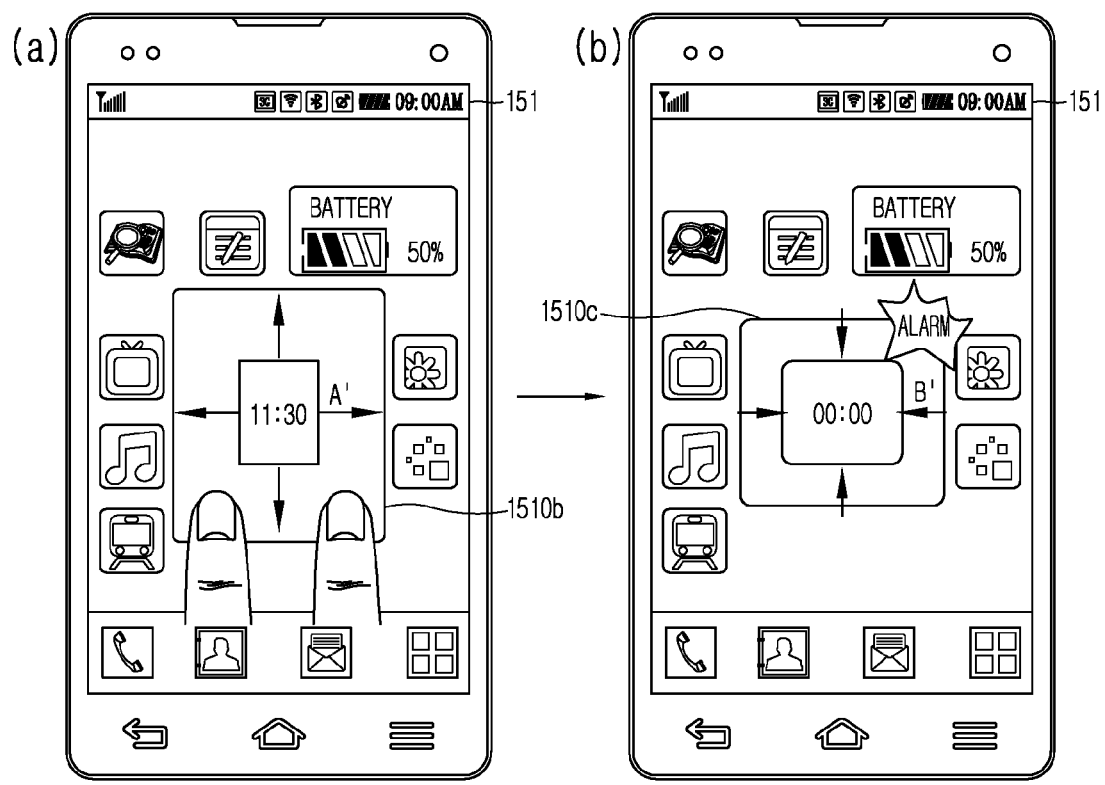

A thirteenth embodiment of the present invention is described referring to FIG. 3, FIG. 15A and FIG. 15B. FIG. 15A and FIG. 15B are diagrams illustrating examples in which, according to the thirteenth embodiment, the screen information in the application outputs an alarm while expanding and contracting as if it were a rubber.

As illustrated in FIG. 15A(a), first screen information 1510a corresponding to an alarm application is output to the display unit 151. The controller 180 receives information on the texture that is set for the alarm application, from the texture setting unit. In FIG. 15A and FIG. 15B, the texture for the alarm application is set to a texture of an "elastic member (rubber, or spring)." The controller 180 determines the distinctiveness of the texture to be applied to the screen information that is output, based on the received information on the texture.

When the first screen information 1510a is output, the controller 180 detects the predetermined-type drag touch input applied to the first screen information 1510a as shown in FIGS. 15(a) and (b). For example, if it is detected that the first and second touch points from which the touch input starts within the first screen information 1510a, as illustrated in FIG. 15A(b), are moved away from each other, the controller 180 switches the first second screen information 1510a to second screen information 1510b to which an "effect of expanding a rubber" is applied along the detected direction A.

The controller 180 may decrease a size of the region of the second screen information 1510b at a given interval of time. That is, the controller 180, as illustrated in FIG. 15A(c), performs the control in such a manner that the size of the region of the second screen information 1510b is decreased in the direction opposite to the detected dragging direction.

If the second screen information 1510b and 1510b' is decreased to the same size of the region as that of the first screen information 1510a, that is, if the second screen information 1510b is switched to the first screen information 1510a, the controller 180 performs the control in such a manner that the size of the region of the second screen information 1510b is not further decreased.

That is, the controller 180 performs the control in such a manner that, when a given amount of time elapses, the second screen information 1510b is returned back to the first screen information 1510a that is the decreased size of the second screen of information 1510b, as if the characteristic of the elastic member is given to the second screen information 1510b.

To do this, the controller 160 presets a minimum size and a maximum size of the region of the second screen information 1510b that can be output. The controller 180 sets the size of the region of the first screen information 1510a to a first reference value (the minimum size of the region), and sets the maximum size of the region of the first screen information 1510a that can be expanded, to a second reference value (the maximum size of the region. The size of the region of the second screen information 1510b is any value between the first reference value and the second reference value that serves as threshold values.

Referring to FIG. 15B(a) and (b), the controller 180 converts a difference in the size of the region between the first screen information 1510b and the second screen information 1510b' as time data. In addition, the controller 180 applies the extent to which the size of the region of the second screen information 1510b and 1510b' is decreased, to the time data, and outputs the result of the application on the display unit 151.

For example, as illustrated in FIG. 15B(a), based on the detected drag touch input, the controller 180 converts the first screen information 1510a to the second screen information 1510b of which the region is expanded, converts the difference in the size of the region with the first screen information 1510a to the time data, and outputs the result of the conversion to one region of the second screen information 1510b. In FIG. 15B(a), "11 minutes 30 seconds" is output as the time data corresponding to the changed size of the region.

If, as the given amount of time elapses, the region of the second screen information 1510b and 1510b' is decreased at the predetermined interval of time (for example, 1 to 2 seconds) to the same size of the region of the first screen information 1510a, that is, if the second screen information 1510b and 1510b' is switched back to the first screen information 1510a, the controller 180 outputs a predetermined alarm signal. For example, in FIG. 15B, if "11 minutes 30 seconds" runs down to "0 minute 0 second," representing the decreasing time data, the predetermined alarm signal is generated. The alarm signal is displayed on the display unit 151, is output as a sound through the audio output module 152, and/or is output a vibration through the haptic module 154.

Figure 16A:
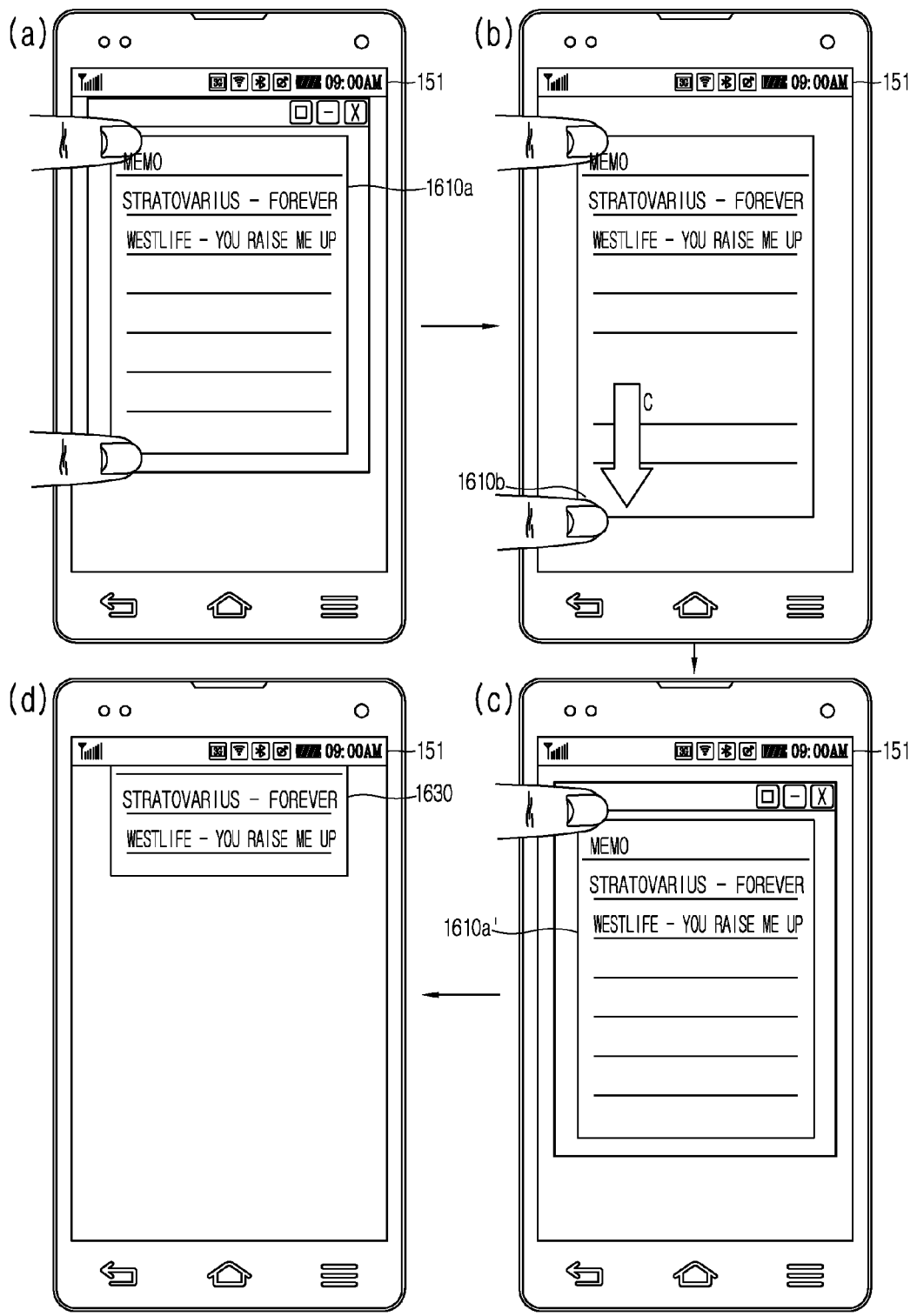
FIG. 16A includes diagrams illustrating an example in which, according to a fourteenth embodiment, the screen information in the application is transmitted while bouncing around as if it were a rubber.

A fourteenth embodiment of the present invention is described referring to FIG. 3 and FIG. 16A. FIG. 16A includes diagrams illustrating an example in which, according to a fourteenth embodiment, the screen information in the application is transmitted while bouncing around as if it were a rubber. As illustrated in FIG. 16A(a), first screen information 1610a corresponding to the memo application, is output to the display unit 151. The controller 180 receives the information on the texture that is set for the memo application, from the texture setting unit. In FIG. 16A, the texture for the memo application is set to a texture of the "elastic member (rubber, or spring)."

When the first screen information 1610a is output, the controller 180 detects the predetermined-type drag touch input. For example, if it is detected that, as illustrated in FIG. 16A(b), any one of the first and second touch points from which the drag touch input to the first screen information 1610a start is moved in a direction C in which the one goes away from the other, the controller 180 switches the first second screen information 1610a to second screen information 1610b to which the "effect of expanding a rubber" is applied along the dragging direction C.

If the touch to the touch point that is dragged is ended in this state, the second screen information 1610b, as illustrated in FIG. 16A(a), is switched back to the first screen information 1610a. If the touch to the other touch point is ended in this state, the controller 180, as illustrated in FIG. 16A, performs the control in such a manner that the first screen information 1610*a* is moved in the direction opposite to the dragging direction C and disappears from the display unit 151.

At this time, if the touch input to at least one of the first and second touch points is ended, the controller 180 switches the second screen information 1610*b* to the first screen information 1610*a* and cancels the execution of the control command relating to the application. Here, a transmission command described below is not executed.

If the first screen information 1610*a* disappears from the display unit 151, the controller 180 transmits an item included in the first screen information 1610*a* to a destination included in the first screen information 1616*a*. The detailed descriptions of the transmission and the embodiments are provided above referring to FIG. 7, and thus the further descriptions thereof are omitted.

Figure 16B:
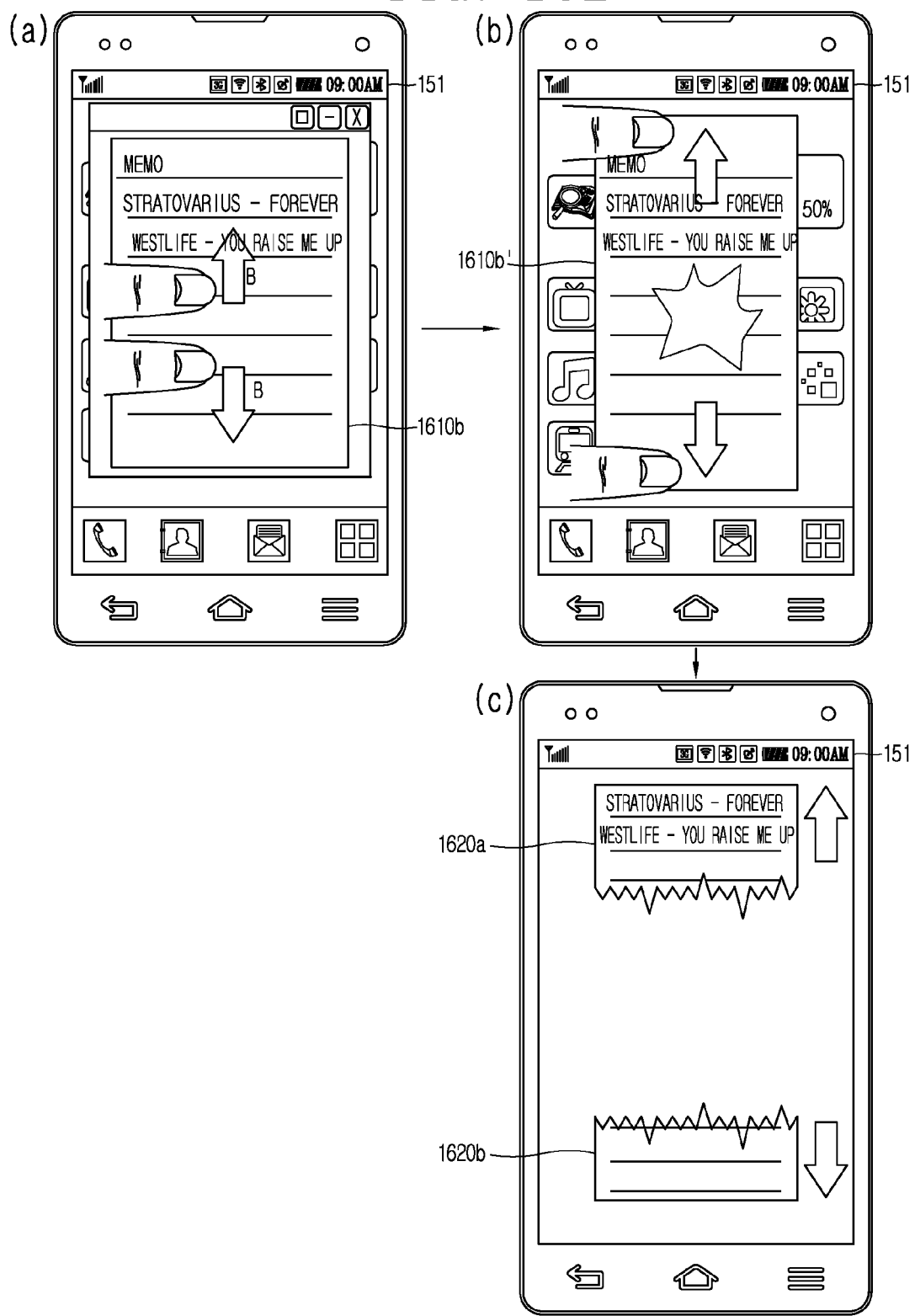
FIG. 16B includes diagrams illustrating an example in which, according to a fifteenth embodiment, the screen information in the application is deleted as if it were a rubber that expanded too much and lost electricity.

A fifteenth embodiment of the present invention is described referring to FIG. 3 and FIG. 16B. FIG. 16B includes diagrams illustrating an example in which, according to the fifteenth embodiment, the screen information in the application is deleted as if it were a rubber that expanded too much and lost electricity. As illustrated in FIG. 16B(a), first screen information 1610*b* corresponding to the memo application, is output to the display unit 151.

The controller 180 receives the information on the texture that is set for the memo application, from the texture setting unit. In FIG. 16B, the texture for the memo application is set to a texture of the "elastic member (rubber, or spring)."

When the first screen information 1610*b* is output, the controller 180 detects the predetermined-type drag touch input. For example, if it is detected that, as illustrated in FIG. 16B (a) and (b), the first and second touch points from which the drag touch input to the first screen information 1610*b* starts are moved in a direction B in which they go away from each other, the controller 180 switches the first second screen information 1610*a* to second screen information 1610*b'* to which the "effect of expanding a rubber" is applied along the dragging direction B.

At this time, if the touch input to at least one of the first and second touch points is ended, the controller 180 switches the second screen information 1610*b'* to the first screen information 1610*b* and cancels the execution of the control command relating to the application. Here, the size of the region of the second screen information 1610*b'* is restored, and the cancellation of the execution is performed.

On the other hand, if according to the drag touch input, at least part of the region to which the second screen information is output is moved out of the reference region, that is, if the part of the region exceeds a predetermined elastic threshold value, the controller 180 divides the second screen information 1610*b'* into two, and moves the result of the division in the first and second direction, respectively. The controller 180 outputs to the display unit 151 the items of screen information 1620*a* and 1620*b* that results from the division, to which an "effect of making an elastic member lose electricity and be broken into two" is applied, and moves each of the items of screen information 1620*a* and 1620*b* in the dragging direction D, thereby making them disappear as shown in FIG. 16B(c).

Along with this, the controller 180 performs executes the deletion control command on the second screen information 1620*a* and 1620*b*. In addition, if, according to the drag touch input, at least one part of the region to which the second screen information 1610*b'* is output reaches the reference region, that is, if the one part of the region reaches the predetermined elastic threshold value, the controller 180 outputs a warning alarm against the second screen information 1610*b'*.

A sixteenth embodiment of the present invention is described referring to FIG. 3 and FIG. 16C. FIG. 16C includes diagrams illustrating an example in which, according to an embodiment, the screen information in the application is deleted as if it were a rubber that expanded too much and lost electricity; and As illustrated in FIG. 16C(a), first screen information 1621 corresponding to the memo application, is output to the display unit 151. The controller 180 receives the information on the texture that is set for the memo application, from the texture setting unit. In FIG. 16C, the texture for the memo application is set to a texture of the "elastic member (rubber, or spring)."

When the first screen information 1621 is output, the controller 180 detects the predetermined-type drag touch input. For example, if it is detected that, as illustrated in FIG. 16C, the first touch point from which the drag touch input to the first screen information 1621 starts are moved in the downward direction, the controller 180 switches the first second screen information 1621 to second screen information 1622 to which the "effect of expanding a rubber" is applied along the dragging direction as shown in FIG. 16C(b).

The controller 180, as illustrated in FIG. 16C, performs the control in such a manner that a function relating to the text input is performed on at least one region of the second screen information 1622. If the predetermined-type touch input is detected after performing the text input on the second screen information 1622, the controller 180 controls the display unit 151 in such a manner that the first screen information 1623 to which the text input is added is output to the second screen information 1622 as shown in FIG. 16(*c*).

As described above, in the mobile terminal according to the embodiments of the present invention and the method of controlling the mobile terminal, a specific texture is set for an application according to a predetermined reference, and if a user input is detected, control is performed in such a manner that a screen corresponding to the application is switched to a screen to which an effect according to the texture that is set is applied. As a result, a user has intuitive control over the mobile terminal, along with a yearning for the analog environment and a pleasure to experience it.

The foregoing embodiments and advantages are merely exemplary and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a wireless communication unit configured to wirelessly communicate with at least one other terminal;
a display unit configured to display screen information; and
a controller configured to:
receive two or more touch and drag inputs on the displayed screen information,
apply a visually changing effect of folding a sheet of paper to the displayed screen information, wherein a number of folds applied to the displayed screen information corresponds to the number of touch and drag inputs applied to the displayed screen information, and
transmit a message included in the displayed screen information to a destination included in the displayed screen information or to a designated party, by using a transmission application corresponding to the number of folds applied to the displayed screen information, wherein different transmission applications correspond to different positive numbers of folds applied to the displayed screen information.

2. The mobile terminal of claim 1, wherein the displayed screen information corresponds to a memo or message application, and
when a received input is a blowing into a sensor on the mobile terminal, the controller is further configured to apply a visually changing effect of flying paper and to visually move the flying paper into a trash bin displayed on the display unit.

3. The mobile terminal of claim 1, wherein the displayed screen information corresponds to a message or mail application, and a received input is a touch and drag on the display unit, and the controller is further configured to apply a visually changing effect of transforming a sheet of paper into an envelope and to transmit the enveloped paper to a party designated for the message or mail application.

4. The mobile terminal of claim 1, wherein the displayed screen information corresponds to a memo or message application, and a received input is a touch and drag on the display unit, and the controller is further configured to apply a visually changing effect of folding a sheet of paper like a closed window shade such that background information displayed behind the memo or message application is exposed.

5. The mobile terminal of claim 1, wherein the controller is further configured to execute first and second applications simultaneously on the mobile terminal and display first screen information corresponding to the first application and second screen information corresponding to the second application, and
wherein screen information of the first application corresponds to a listing of items, screen information of the second application corresponds to a messaging or mailing application, and a received input is a first touch and drag of selected items from the first screen information to the second screen information and a second touch and drag on the second screen information, and the controller is further configured to attach the selected items to the second application and visually change a paper of the second application into an envelope and transmit the enveloped paper to a party designated for the message or mail.

6. The mobile terminal of claim 1, wherein the controller is further configured to execute first and second applications simultaneously on the mobile terminal and display first screen information corresponding to the first application and second screen information corresponding to the second application, and
wherein if a received input is a touch and drag from the first screen information to the second screen information, the controller is further configured to execute a control command relating to the second application based on data included in the first screen information.

7. A method of controlling a mobile terminal, the method comprising:
displaying, via a display unit of the mobile terminal, screen information;
receiving, via a controller, two or more touch and drag inputs on the displayed screen information;
applying, via the controller, a visually changing effect of folding a sheet of paper to the displayed screen information, wherein a number of folds applied to the displayed screen information corresponds to the number of touch and drag inputs is applied to the displayed screen information; and
transmitting a message included in the displayed screen information to a destination included in the displayed screen information or to a designated party, by using a transmission application corresponding to the number of folds applied to the displayed screen information, wherein different transmission applications correspond to different positive numbers of folds applied to the displayed screen information.

* * * * *